US010476246B2

(12) United States Patent
Yoshimura et al.

(10) Patent No.: US 10,476,246 B2
(45) Date of Patent: Nov. 12, 2019

(54) PROTECTIVE MEMBER, TUBE MOUNTING STRUCTURE, AND METHOD FOR MOUNTING A TUBE

(71) Applicant: Yazaki Corporation, Tokyo (JP)

(72) Inventors: Katsuya Yoshimura, Toyota (JP); Michihito Suzuki, Toyota (JP); Naoto Kuzutani, Toyota (JP); Akihito Futori, Toyota (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/106,711

(22) Filed: Aug. 21, 2018

(65) Prior Publication Data
US 2019/0123531 A1 Apr. 25, 2019

(30) Foreign Application Priority Data
Oct. 19, 2017 (JP) .................................. 2017-202441

(51) Int. Cl.
*H02G 3/04* (2006.01)
*H02G 3/06* (2006.01)

(52) U.S. Cl.
CPC ......... *H02G 3/0468* (2013.01); *H02G 3/0691* (2013.01); *H02G 3/0418* (2013.01); *H02G 3/0437* (2013.01)

(58) Field of Classification Search
CPC .. H02G 3/0468; H02G 3/0418; H02G 3/0691; H02G 3/0437
USPC ....................................................... 174/72 R
See application file for complete search history.

(56) References Cited

U.S. PATENT DOCUMENTS

| | | | | |
|---|---|---|---|---|
| 4,457,544 A | * | 7/1984 | Snow | F16L 25/0036 285/251 |
| 4,758,685 A | * | 7/1988 | Pote | H01B 11/1843 156/55 |
| 4,989,905 A | * | 2/1991 | Rajecki | F16L 25/0045 285/319 |
| 5,288,087 A | * | 2/1994 | Bertoldo | H02G 3/06 277/616 |
| 6,007,388 A | * | 12/1999 | Kooiman | H01R 13/052 439/825 |
| 6,209,929 B1 | * | 4/2001 | Ikegami | F16L 5/06 285/139.2 |
| 2004/0154817 A1 | * | 8/2004 | Sudo | H02G 3/0468 174/481 |

(Continued)

FOREIGN PATENT DOCUMENTS

JP 2010-220361 A 9/2010
JP 2011-244650 A 1/2011

*Primary Examiner* — Sherman Ng
(74) *Attorney, Agent, or Firm* — Sughrue Mion, PLLC

(57) ABSTRACT

A protective member able to prevent a protector from being large-sized, and to prevent a crush of an end section of a corrugated tube, a tube mounting structure using such a protective member, and a method of mounting a tube are provided. An inner member (protective member) includes: a tubular section fitted into an end section of a corrugated tube, and harder than this corrugated tube; and an outer peripheral rib formed so as to extend in a circumferential direction on an outer periphery of the tubular section, and inserted into an inner peripheral annular concave at the end section of the corrugated tube.

11 Claims, 16 Drawing Sheets

(56) References Cited

U.S. PATENT DOCUMENTS

| | | | | |
|---|---|---|---|---|
| 2005/0099005 A1* | 5/2005 | Fullbeck | ............. | F16L 33/2073 |
| | | | | 285/256 |
| 2005/0272264 A1* | 12/2005 | Doherty | ............. | F16L 25/0045 |
| | | | | 438/690 |
| 2009/0050350 A1* | 2/2009 | Katsumata | ........... | H02G 3/0468 |
| | | | | 174/135 |
| 2009/0166480 A1* | 7/2009 | Sakata | ................ | B60R 16/0215 |
| | | | | 248/71 |
| 2010/0230157 A1* | 9/2010 | Sakata | ................ | B60R 16/0215 |
| | | | | 174/72 A |
| 2012/0018997 A1* | 1/2012 | Roberts | ................ | H02G 3/0691 |
| | | | | 285/149.1 |
| 2015/0369406 A1* | 12/2015 | Dieduksman | ........... | F16L 21/06 |
| | | | | 285/417 |

\* cited by examiner

PROTECTIVE MEMBER, TUBE MOUNTING STRUCTURE, AND METHOD FOR MOUNTING A TUBE

TECHNICAL FIELD

The present invention relates to a protective member to prevent a crush of an end section of a corrugated tube, a tube mounting structure using such a protective member, and a method of mounting a tube.

BACKGROUND ART

Conventionally, a corrugated tube is widely used as a member for protecting a wiring harness while keeping flexibility of the wiring harness. The corrugated tube is used while the wiring harness is inserted into an inside of the corrugated tube. Sometimes an end section of the corrugated tube is fitted into and mounted on a hard tubular protector protecting solidly the wiring harness extending from the end section (for example, refer to Patent Literature 1). An inner periphery of such a protector is often provided with an inner peripheral rib inserted into an outer peripheral annular concave section at an end section of the corrugated tube. Such an inner peripheral rib works as a retainer of the end section of the corrugated tube.

Here, the corrugated tube is made of flexible resin. Further, a slit for receiving a wiring harness thereinside sometimes extends in an axial direction. Owing to these, the corrugated tube may be easy to be crashed. As a result, the end section of the corrugated tube mounted on the protector may be crashed due to a force generated when the wiring harness is bent or the like, and the outer peripheral annular concave section may be uncoupled from the inner peripheral rib, and released from the protector.

Therefore, upon mounting on the protector, a technique is proposed that a hard protective member is applied to the end section of the corrugated tube to prevent the end section from being crashed (for example, refer to Patent Literature 2).

CITATION LIST

Patent Literature

Patent Literature 1: JP 2011-244650 A
Patent Literature 2: JP 2010-220361 A

SUMMARY OF INVENTION

Technical Problem

In the technique described in Patent Literature 2, for preventing the protective member mounted on the end section of the corrugated tube from falling out, a structure for fixing the protective member to the corrugated tube by winding a tape or the like is provided. Thereby, a protector mounted on the end section of the corrugated tube tends to become large for receiving such a fixing structure.

Further, a worker may cut out the corrugated tube to use, and a length of the corrugated tube is often varied. In the technique described in Patent Literature 2, an outer diameter of the protective member becomes larger than an outer diameter of the corrugated tube. When the length of the corrugated tube is varied as described above, a position where the protective member is received in an interior of the protector is also varied. Because the outer diameter of the protective member is large as described above, it is necessary to have a margin in an inside space of the protector for receiving the protective member at any position. On this point also, in the technique described in Patent Literature 2, the protector tends to be large.

Accordingly, in view of the problems described above, an object of the present invention is to provide a protective member able to prevent a protector from being large-sized, and to prevent a crush of an end section of a corrugated tube, a tube mounting structure using such a protective member, and a method of mounting a tube.

Solution to Problem

For solving the problems above, according to a first aspect of the present invention, there is provided a protective member including:

a tubular section fitted into an end section of a corrugated tube, and harder than the corrugated tube; and an outer peripheral rib formed so as to extend in a circumferential direction on an outer periphery of the tubular section, and inserted into an inner peripheral annular concave section at the end section of the corrugated tube.

For solving the problems above, according to a second aspect of the present invention, there is provided a tube mounting structure for mounting a corrugated tube on a tubular protector by fitting an end section of the corrugated tube, into which a wiring harness is inserted, into the protector, wherein at least one row of an inner peripheral rib extending in an inner circumference direction is formed on an inner periphery of the protector, wherein the end section of the corrugated tube is mounted on the protector such that the inner peripheral rib is inserted into an outer peripheral annular concave section at the end section, and wherein the protective member according to the first aspect is fitted into the end section of the corrugated tube while the wiring harness is inserted into an inside of the protective member.

For solving the problems above, according to a third aspect of the present invention, there is provided a method for mounting a tube by fitting an end section of a corrugated tube, into which a wiring harness is inserted, into a tubular protector, wherein at least one row of an inner peripheral rib extending in an inner circumference direction is formed on an inner periphery of the protector, said method including:

a first step of inserting the wiring harness into an inside of a protective member having a tubular section harder than the corrugated tube and an outer peripheral rib formed so as to extend in a circumferential direction on an outer periphery of the tubular section;

a second step of inserting the wiring harness into an inside of the corrugated tube and fitting the protective tube into the end section such that the outer peripheral rib is inserted into an inner peripheral annular concave section at the end section of the corrugated tube; and a third step of mounting the end section of the corrugated tube on the protector such that the inner peripheral rib is inserted into an outer peripheral annular concave section at the end section, wherein the tubular section of the protective member includes: a plurality of tube portions arranged in the circumferential direction; and a hinge section joining end edges adjacent to each other of the plurality of tube portions other than both ends of the arranged end edges, the tubular section is openable and closable such that both end edges are moved close to and away from each other, the outer peripheral rib is a collectivity of rib portions as a part of a ring extending in the circumferential direction, and wherein the first step is the step of inserting the wiring harness into an inside of the protective member such that after the wiring harness is arranged inside of the protective member while the protective member is open and both end edges are away from each other, the protective member is closed.

Effect of the Invention

According to the present invention, the hard tubular section prevents the end section of the corrugated tube from being crashed. Further, by fitting the outer peripheral rib into the inner peripheral annular concave section at the end section of the corrugated tube, the protective member is also prevented from falling out of the end section of the corrugated tube. Further, because the protective member having such prevention effects is a member received in an interior of the end section of the corrugated tube, it is unnecessary to provide a new space in the interior of the protector where the end section of the corrugated tube is mounted, and the protector is prevented from being large-sized. In this way, according to the present invention, the protector is prevented from being large-sized, while a crush of the end section of the corrugated tube is prevented.

DESCRIPTION OF EMBODIMENT

Hereinafter, an embodiment of the present invention will be described. First, the first embodiment will be described.

Figure 1:
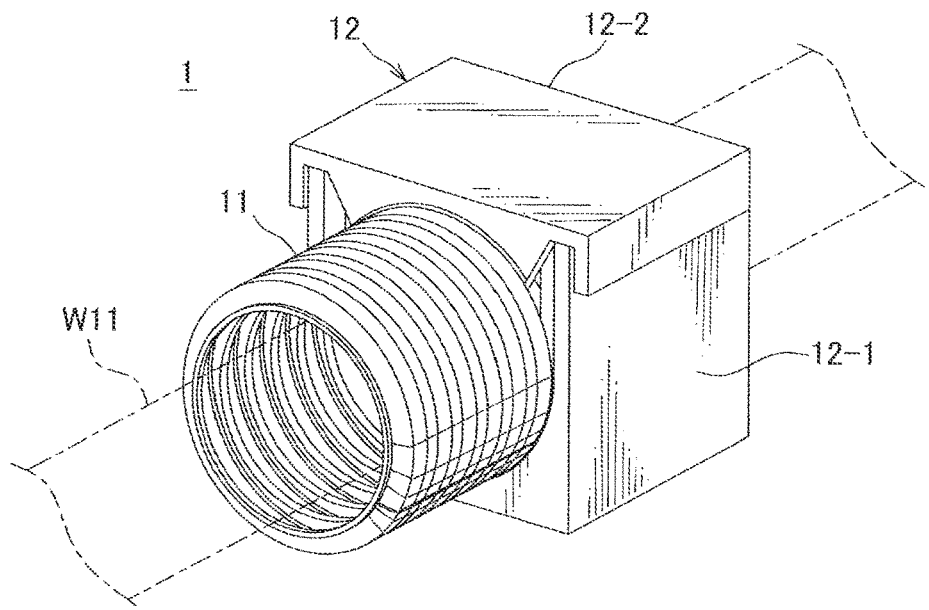
FIG. 1 is a perspective view showing a wiring harness protective structure according to a first embodiment of the present invention.

FIG. 1 is a perspective view showing a wiring harness protective structure according to the first embodiment of the present invention.

A wiring harness protective structure 1 shown in FIG. 1 is a structure for protecting a wiring harness W11 mounted on a vehicle, and includes a corrugated tube 11 and a protector 12. The corrugated tube 11 is a resin-made bellows-shaped flexible tube, and protects a flexibility-secured portion of the wiring harness W11. The corrugated tube 11 is mounted by fitting an end section of the corrugated tube 11 into the protector 12 while the wiring harness W11 is inserted into the corrugated tube 11. The protector 12 is a resin-made hard rectangular-tubular member for protecting solidly the wiring harness W11, and protects a bent-unnecessary portion of the wiring harness W11. In this embodiment, the protector 12 includes a main body section 12-1 and a cover section 12-2.

Figure 2:
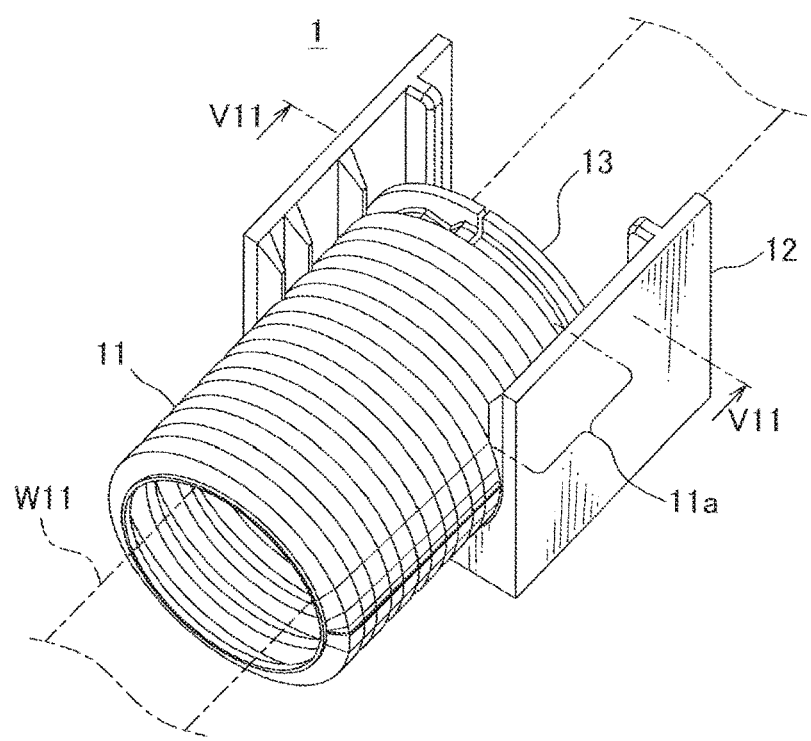
FIG. 2 is a perspective view showing an inside of a main body section by removing a cover of a protector in the wiring harness protective structure of FIG. 1.

FIG. 2 is a perspective view showing an inside of a main body section by removing a cover of a protector in the wiring harness protective structure of FIG. 1. Hereinafter, the protector 12 and the main body section 12-1 are not distinguished specifically unless otherwise noted, and described referred to as protector 12.

As shown in FIG. 2, the wiring harness protective structure 1 includes an inner member 13 in addition to the corrugated tube 11 and the protector 12. The inner member 13 is a resin-made protective member fitted into an end section 11a of the corrugated tube 11 mounted on the protector 12 and prevents a crush of the end section 11a.

In this wiring harness protective structure 1, a tube mounting structure for fitting the end section 11a of the corrugated tube 11, into which the wiring harness W11 is inserted, into the tubular protector 12 to mount the corrugated tube 11 on the protector 12 is as follows.

Figure 3:
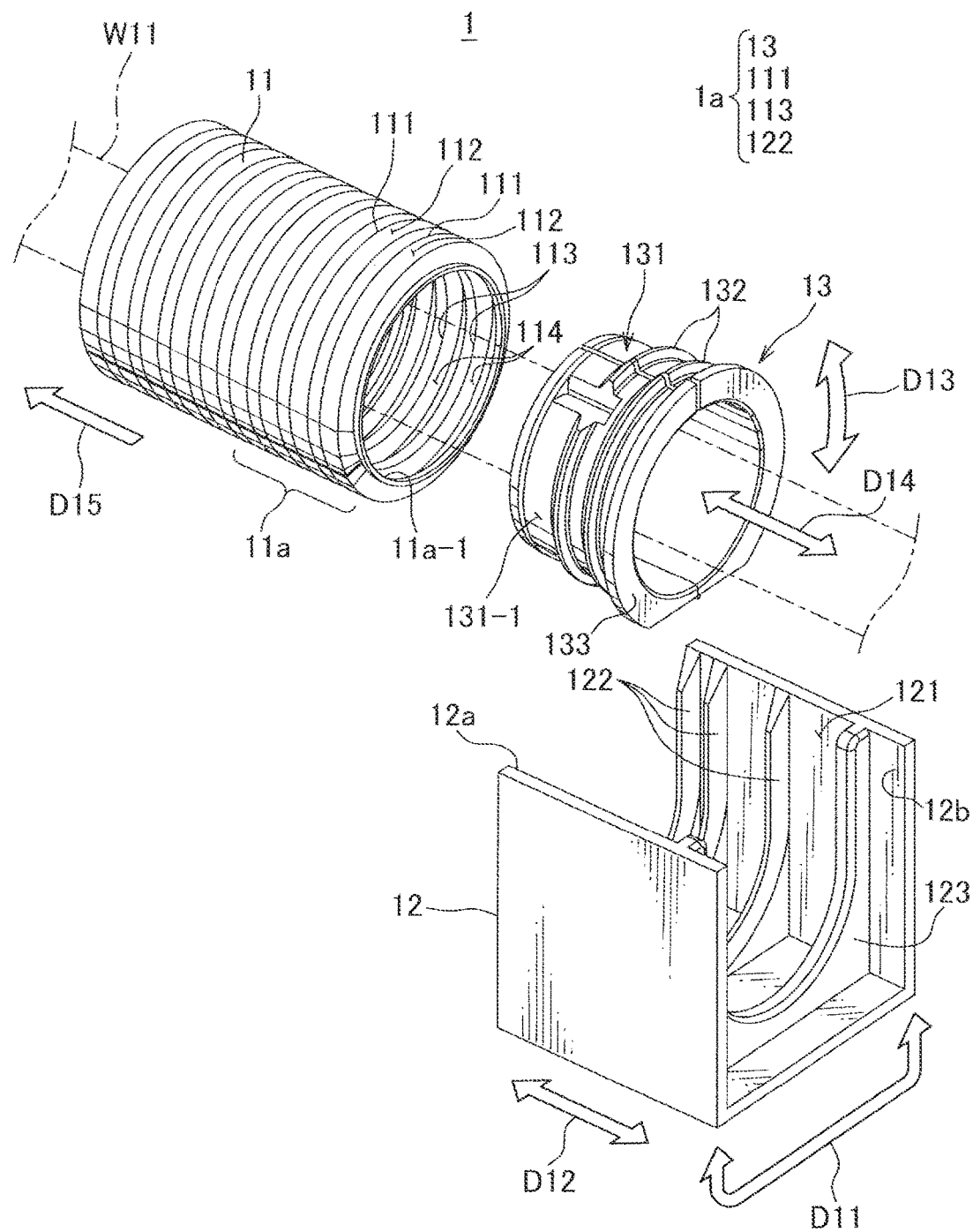
FIG. 3 is an exploded perspective view showing a tube mounting structure in the wiring harness protective structure of FIGS. 1 and 2.
Figure 4:
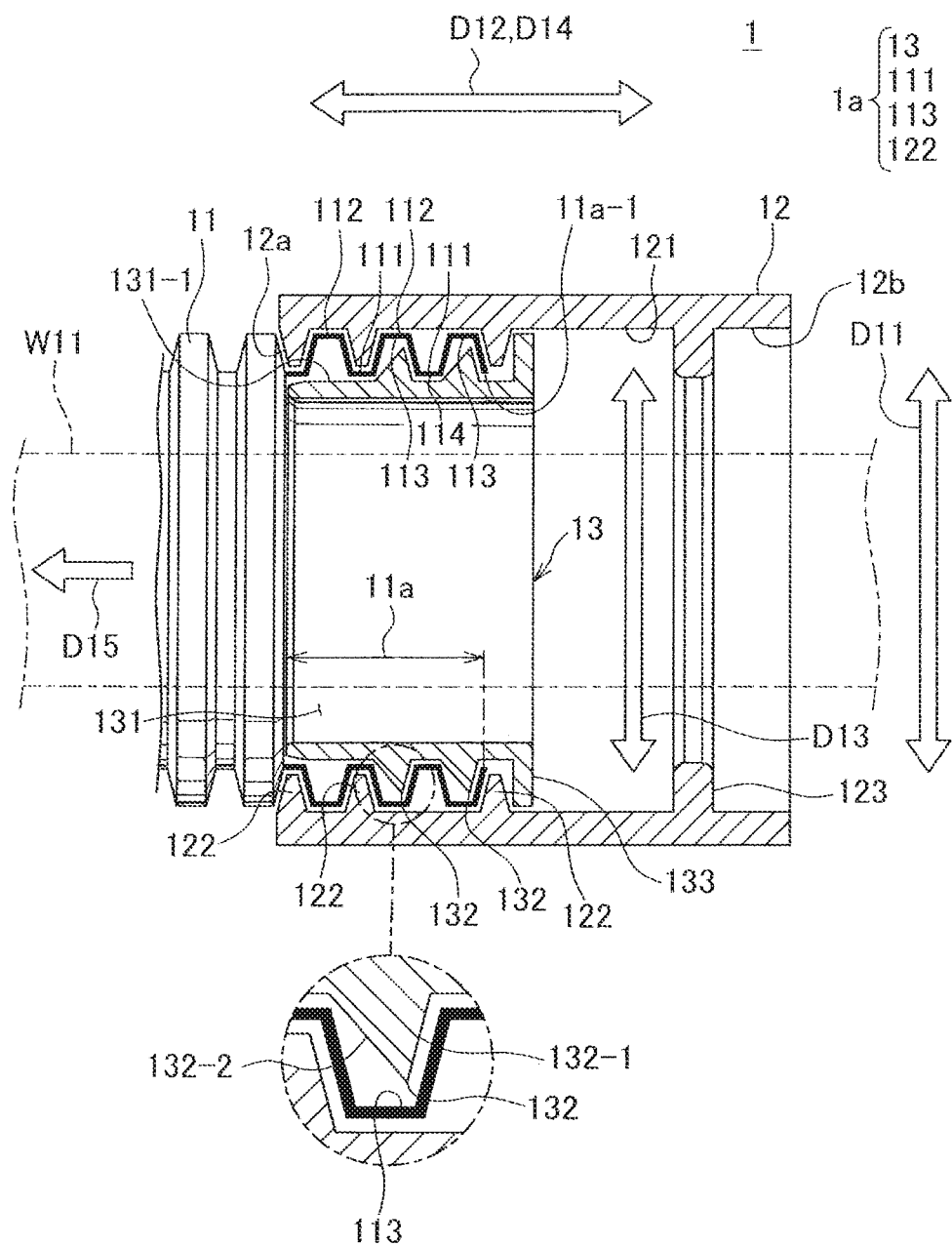
FIG. 4 is a sectional view taken on line VII-VII in FIG. 2 showing the tube mounting structure in the wiring harness protective structure of FIGS. 1 and 2.

FIG. 3 is an exploded perspective view showing a tube mounting structure in the wiring harness protective structure of FIGS. 1 and 2. Further, FIG. 4 is a sectional view taken on line VII-VII in FIG. 2 showing the tube mounting structure in the wiring harness protective structure of FIGS. 1 and 2.

In a tube mounting structure 1a of the wiring harness protective structure 1, three rows of inner peripheral ribs 122 extending in an inner circumferential direction D11 are arranged in an axial direction D12 on an inner periphery 121 of the protector 12. Further, a stopper rib 123 for stopping the corrugated tube 11 so that the corrugated tube 11 is prevented from getting out from an exit 12b is formed near the exit 12b of the wiring harness W11 opposite to the mounting opening 12a for mounting the corrugated tube 11.

The end section 11a of the corrugated tube 11 is attached to a mounting opening 12a side of the protector 12 so that the inner peripheral rib 121 of the protector is inserted into an outer peripheral annular concave section 111 of the end section 11a.

Further, a pitch between the two rows of inner peripheral ribs 122 of the three inner peripheral ribs near the mounting opening 12a corresponds to a pitch of the outer peripheral annular concave sections 111 of the corrugated tube 11. In other words, an interval between these two rows of inner peripheral ribs 122 is an interval therebetween into which an outer peripheral annular convex section 112 of the corrugated tube 11 is inserted. Further, an interval between these two rows of inner peripheral ribs 122 and the one inner peripheral rib 122 near the exit 12b is an interval therebetween into which two outer peripheral annular convex sections 112 are inserted.

Here, the inner member 13 for preventing a crash of the end section 11a of the corrugated tube 11 includes a tubular section 131, an outer peripheral rib 132, and an exit flange 133. The tubular section 131 is a tubular section harder than the corrugated tube 11 and to be fitted into the end section 11a of the corrugated tube 11. The outer peripheral rib 132 is formed so as to extend in an inner circumferential direction D13 on an outer periphery 131-1 of the tubular section 131, and is inserted into an inner peripheral annular concave section 113 at the end section 11a of the corrugated tube 11. In this embodiment, two rows of the outer peripheral ribs 132 are arranged side by side in an axial direction D14 of the tubular section 131. The exit flange 133 is a flange section of which diameter is larger than an inner diameter of an opening 11a-1 of the corrugated tube 11, and exposed outside from the opening 11a-1 when the inner member 13 is fitted into the corrugated tube 11.

A pitch of the outer peripheral ribs 132 corresponds to a pitch of the inner peripheral annular concave sections 113 of the corrugated tube 11. In other words, one inner peripheral annular convex section 114 of the corrugated tube 11 is inserted into a gap between two rows of the outer peripheral ribs 132, namely, one inner peripheral rib 122 of the protector 12 is inserted into the gap between two rows of the outer peripheral ribs 132. In this embodiment, the inner member 13 is fitted into the end section 11a of the corrugated tube 11 such that these two rows of the outer peripheral ribs 132 are inserted into the two rows of the inner peripheral annular concave sections 113 which are first and second numbered from the opening 11a-1 side.

Further, an interval between the outer peripheral rib 132 near the exit flange 133 and the exit flange 133 is an interval into which one inner peripheral rib 122 of the protector 12 is inserted.

Further, as shown in an enlarged view of FIG. 4, when the outer peripheral rib 132 is inserted into the inner peripheral annular concave section 113, both of an opening side surface 132-1 oriented toward the opening 11a-1 of the corrugated tube 11 and an opposite side surface 132-2 oriented toward the opposite side are sloped surfaces. Further, the opposite side surface 132-2 is a slope gentler than the opening side surface 132-1.

In an embodiment shown in FIG. 4, two rows of the inner peripheral annular concave sections 113, into which the outer peripheral ribs 132 of the inner member 13 are inserted, are inserted into a gap between the inner peripheral rib 122 at the exit 12b side and the next inner peripheral rib 122. One row of the inner peripheral rib 122 at the exit 12b side of the protector 12 is inserted into a gap between the exit flange 133 and the outer peripheral rib 132 next to the exit flange 133. In the embodiment shown in FIG. 4, with regard to a drop direction D15 where the corrugated tube 11 is dropped out from the mounting opening 12a of the protector 12, the inner peripheral rib 122 of the protector 12 and the outer peripheral rib 132 of the inner member 13 are in a positional relationship as follows. Namely, in the drop direction D15, the positional relationship is to hold an outer wall of the corrugated tube 11 in between the inner peripheral rib 122 in the center row of the protector 12 and the outer peripheral rib 132 nearest the mounting opening 12a of the inner member 13. When a force is applied to the corrugated tube 11 in the drop direction D15, the above outer peripheral rib 132 interferes with this inner peripheral rib 122 while holding the outer wall of the corrugated tube 11 in between the outer peripheral rib 132 and the inner peripheral rib 122. Then, in addition to the hard tubular section 131 of the inner member 13 preventing a crash of the end section 11a of the corrugated tube 11, a drop of the corrugated tube 11 is prevented.

Here, a worker may cut out the corrugated tube 11 to use, and a length of the corrugated tube 11 is often varied. In this embodiment, a not-shown end section of the corrugated tube 11 opposite to the protector 12 is fixed to a predetermined structure as a reference end, and the protector 12 is fixed to the other structure. Therefore, when the length of the corrugated tube 11 is varied, a position of the end section 11a of the corrugated tube 11 in the axial direction D12 is varied in an interior of the protector 12. In this embodiment, as long as the position of the end section 11a of the corrugated tube 11 is varied within a range explained as follows, the interference between the outer peripheral rib 132 of the inner member 13 and the inner peripheral rib 122 of the protector 12 like above is established, and the drop is prevented.

Figure 5:
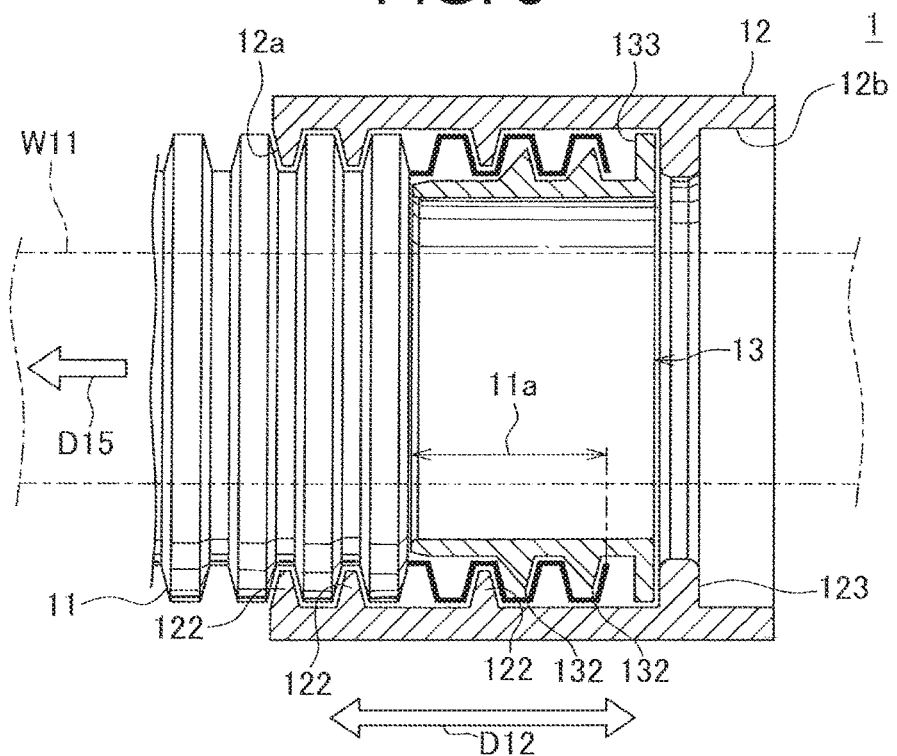
FIG. 5 is a sectional view similar to FIG. 4, showing a state that an end section of a corrugated tube is positioned at the most exit side of a protector within a position range of the end section of the corrugated tube where an outer peripheral rib of an inner member and an inner peripheral rib of the protector interfere with each other.

FIG. 5 is a partially sectional view similar to FIG. 4 showing a state that the end section of the corrugated tube is positioned nearest the exit of the protector within the positional range of the end section of the corrugated tube where the interference between the outer peripheral rib of the inner member and the inner peripheral rib of the protector is established. This embodiment of FIG. 5 corresponds to a case that the length of the corrugated tube 11 is the longest within the range that interference between the outer peripheral rib 132 of the inner member 13 and the inner peripheral rib 122 of the protector 12 is established.

In the embodiment of FIG. 5, the positional relationship is such that the outer wall of the corrugated tube 11 is held between the inner peripheral rib 122 of the protector 12 nearest the exit 12b and the outer peripheral rib 132 of the inner member 13 nearest the mounting opening 12a. When a force is applied to the corrugated tube 11 in the drop direction D15, the above outer peripheral rib 132 interferes with the inner peripheral rib 122 nearest the exit 12b while holding the outer wall of the corrugated tube 11 in between the outer peripheral rib 132 and this inner peripheral rib 122.

Further, in this embodiment, when the end section 11a of the corrugated tube 11 is positioned like above, the stopper rib 123 of the protector 12 is provided at a position where the exit flange 133 of the inner member 13 abuts on the stopper rib 123. Namely, a gap between the inner peripheral rib 122 nearest the exit 12b and the stopper rib 123 of the protector 12 is a gap into which all of the outer peripheral ribs 132 and the exit flange 133 of the inner member 13 are inserted.

Figure 6:
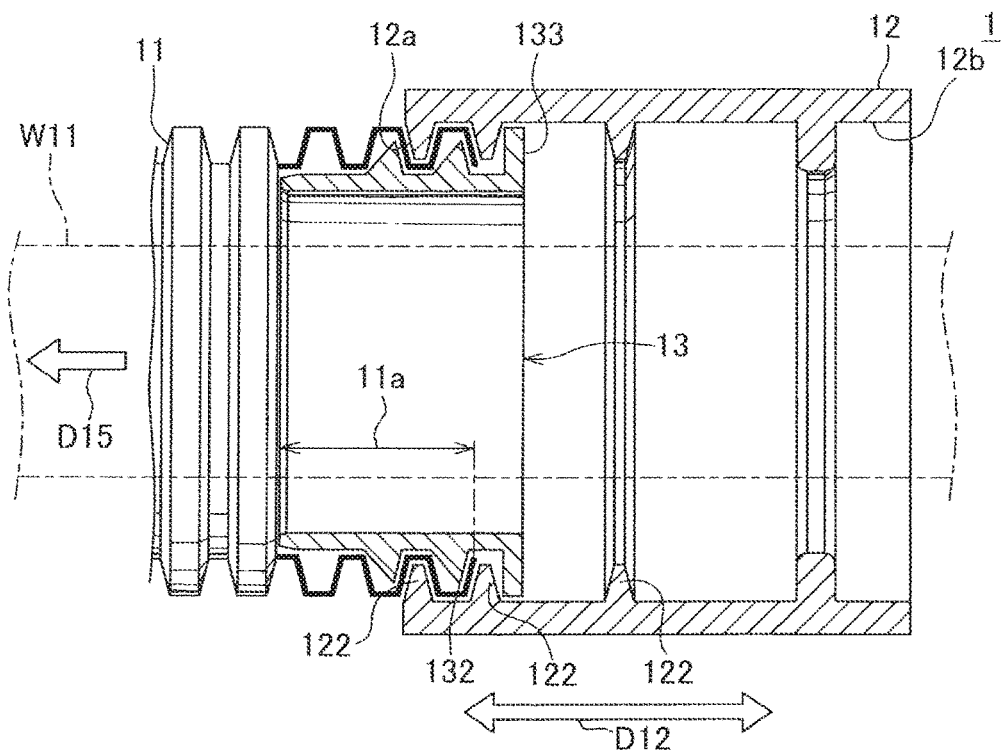
FIG. 6 is a sectional view similar to FIG. 4, showing a state that the end section of the corrugated tube is positioned at the most mounting opening side of the protector within the position range of the end section of the corrugated tube where an outer peripheral rib of an inner member and an inner peripheral rib of the protector interfere with each other.

FIG. 6 is a partially sectional view similar to FIG. 4 showing a state that the end section of the corrugated tube is positioned nearest the mounting opening of the protector within the positional range of the end section of the corrugated tube where the interference between the outer peripheral rib of the inner member and the inner peripheral rib of the protector is established. This embodiment of FIG. 6 corresponds to a case that the length of the corrugated tube 11 is the shortest within the range that interference between the outer peripheral rib 132 of the inner member 13 and the inner peripheral rib 122 of the protector 12 is established.

In the embodiment of FIG. 6, the positional relationship is such that the outer wall of the corrugated tube 11 is held between the inner peripheral rib 122 of the protector 12 nearest the mounting opening 12a and the outer peripheral rib 132 of the inner member 13 nearest the exit 12b. When a force is applied to the corrugated tube 11 in the drop direction D15, the above outer peripheral rib 132 interferes with the inner peripheral rib 122 nearest the mounting opening 12a while holding the outer wall of the corrugated tube 11 in between the outer peripheral rib 132 and this inner peripheral rib 122.

In this embodiment, when a variation of the position of the end section 11a of the corrugated tube 11 in the axial direction D12 is within a range between the position shown in FIG. 5 and the position shown in FIG. 6, the drop of the corrugated tube 11 is prevented due to the interference above.

Next, the inner member 13 in this embodiment will be described in further detail.

Figure 7:
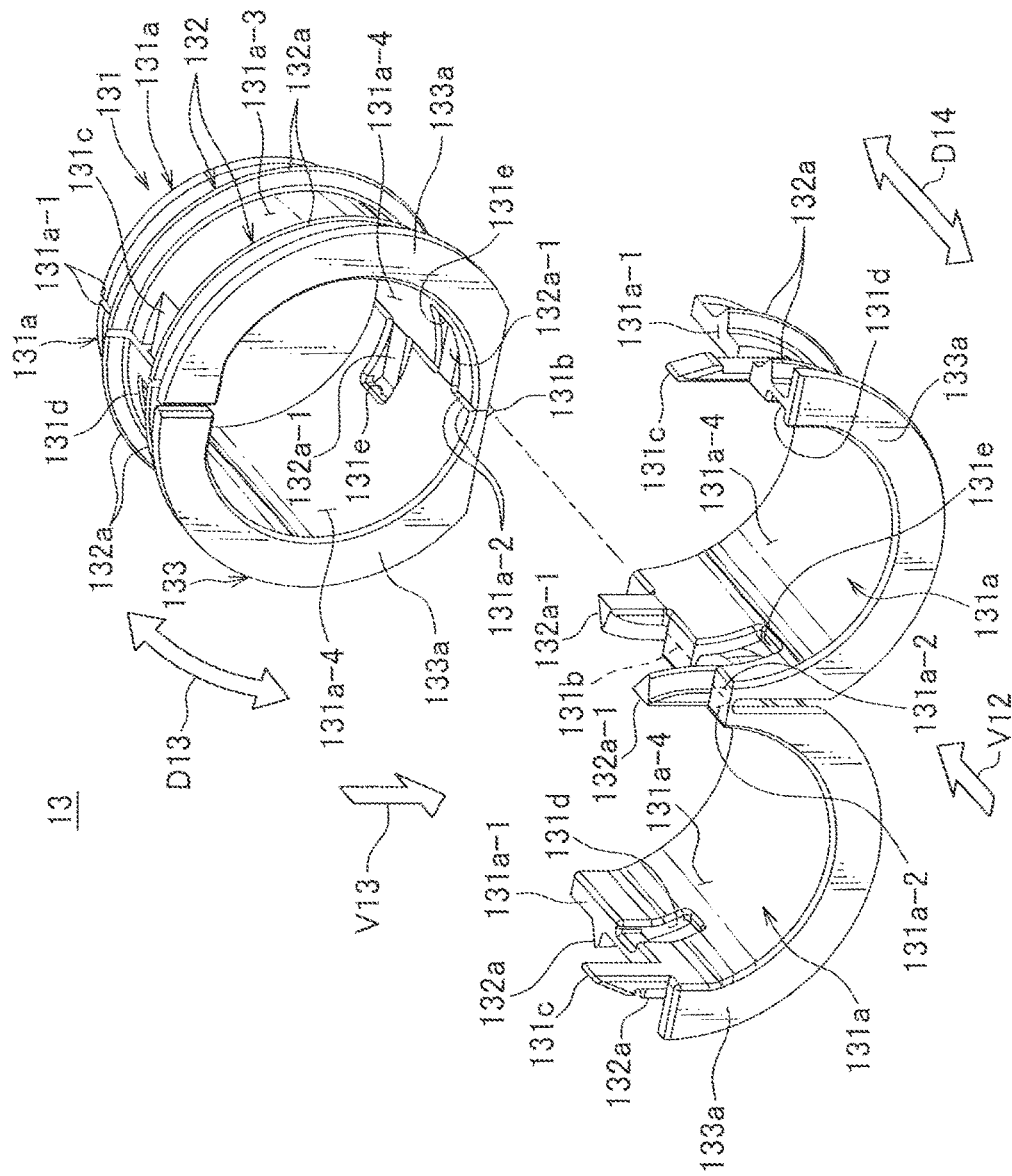
FIG. 7 is a perspective view showing an inner member of FIGS. 2 to 6.
Figure 8:
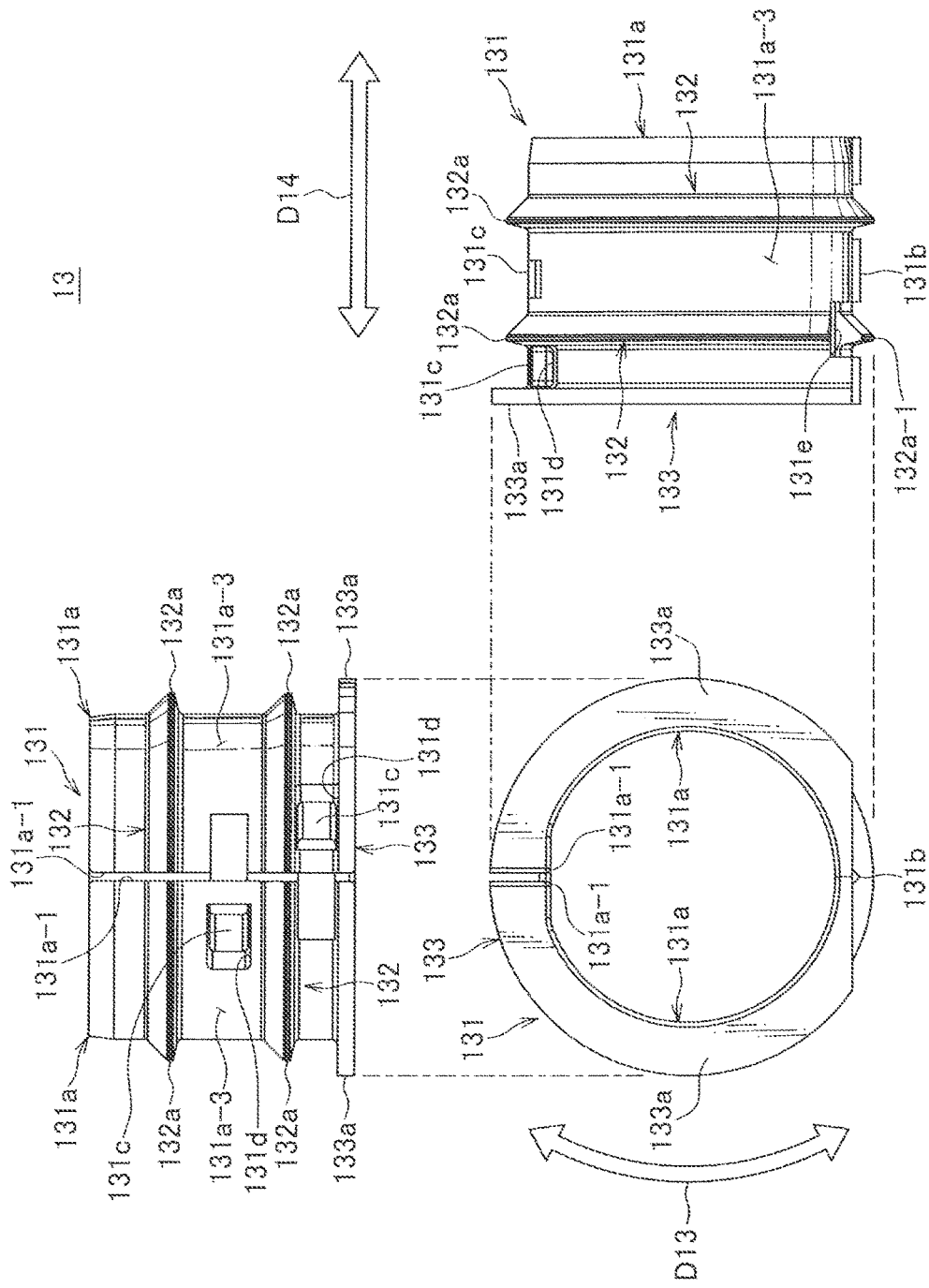
FIG. 8 is a three-sided view showing the inner member of FIGS. 2 to 6.

FIG. 7 is a perspective view of the inner member shown in FIGS. 2 to 6, and FIG. 8 is a three-sided view showing the inner member of FIGS. 2 to 6.

In the inner member 13 of this embodiment, the tubular section 131 includes: two tube portions 131a arranged in the circumferential direction D13; and a hinge section 131b joining end edges 131a-2 adjacent to each other of the two tube portions 131a other than both ends of the arranged end edges 131a-1. This tubular section 131 is openable and closable such that both end edges 131a-1 are moved close to and away from each other. FIG. 7 shows a closed state of the tubular section 131 and an open state of the tubular section 131 arranged side by side.

Figure 9:
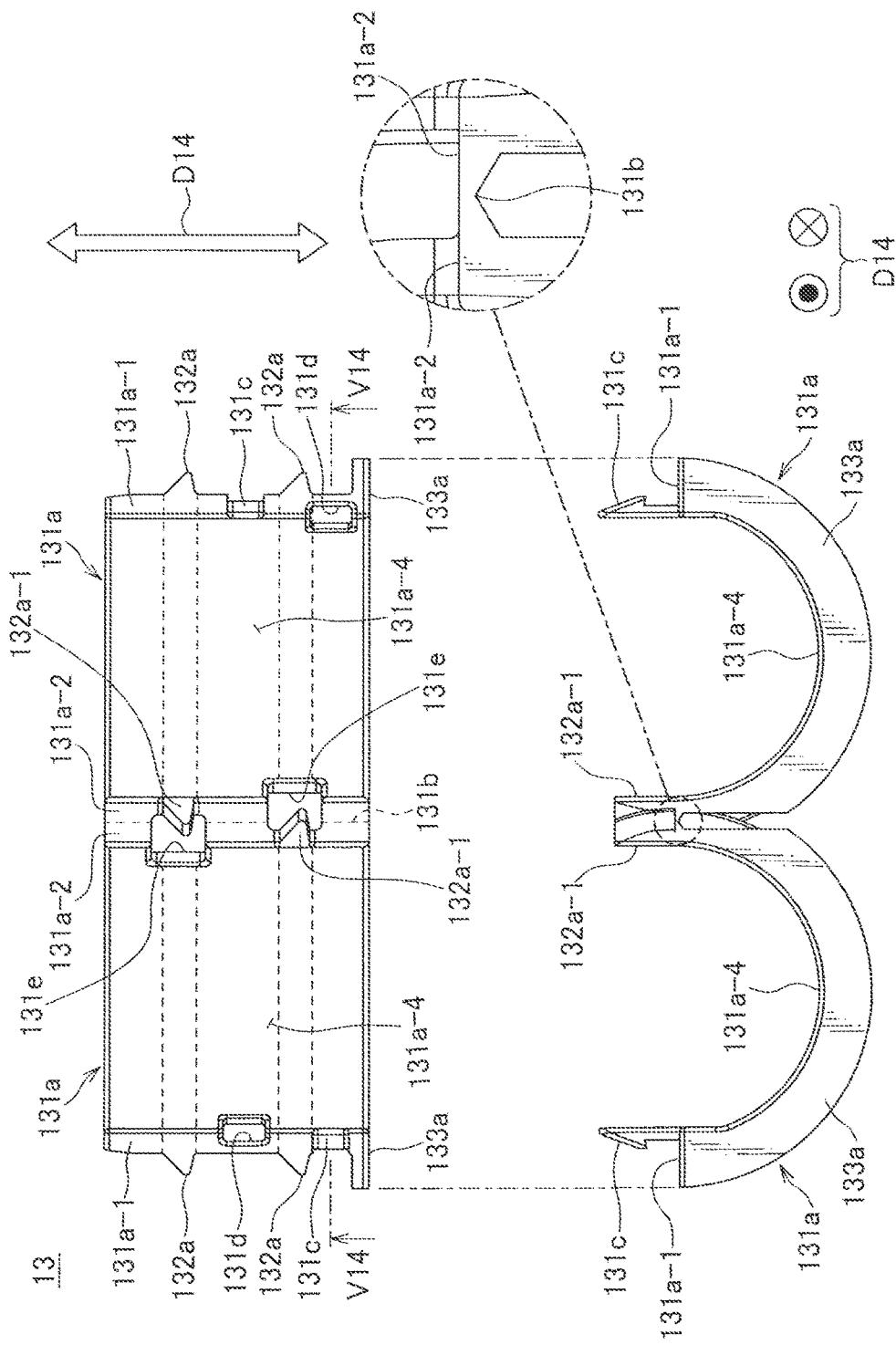
FIG. 9 is a front view of the inner member of which tubular section is open showing from an arrow V12 and a top view showing from an arrow V13 of FIG. 7.
Figure 10:
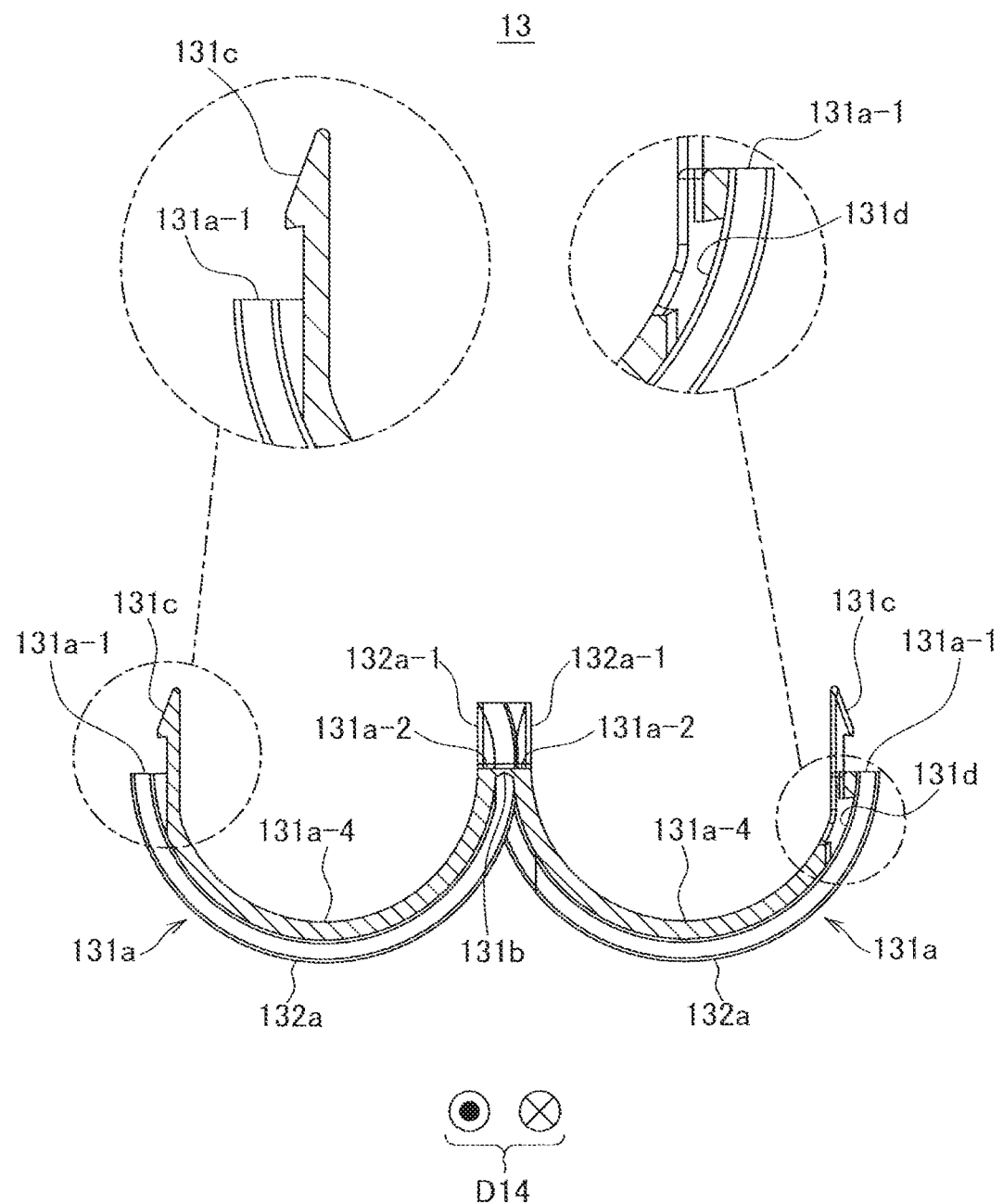
FIG. 10 is a sectional view taken on line V14-V14 of FIG. 9.

FIG. 9 is a front view of the inner member of which tubular section is open showing from an arrow V12 and a top view showing from an arrow V13 of FIG. 7. Further, FIG. 10 is a sectional view taken on line V14-V14 of FIG. 9.

In the inner member 13, the outer peripheral rib 132 is a collectivity of two rib portions 132a each as a part of a ring extending in the circumferential direction D13. Each rib portion 132a is provided on an outer periphery 131a-3 of each of two tube portions 131a. Similarly, the exit flange 133 is a collectivity of two flange portions 133a each as a part of a ring extending in the circumferential direction D13. Each flange portion 133 is provided on a front end of each of two tube portions 131a.

In this inner member 13, a connection convex section 131c projects from each end edge 131a-1 moved close to and away from each other as described above of the two tube portions 131a toward mating end edge 131a-1. Further, the end edge 131a-1 of each tube portion 131a is provided with a connection concave section 131d for receiving and connecting the connection convex section 131c from mating end edge 131a-1. The connection convex section 131c and the connection concave section 131d are arranged side by side in the axial direction D14 on the end edge 131a-1 of each tube portion 131a. Further, the connection convex section 131c and the connection concave section 131d are arranged in a staggered manner in between two tube portions 131a.

Further, as shown in an enlarged view of FIG. 9, a resin of the hinge section 131b coupling two tube portions 131a is formed thinner than the tube portion 131a, and owning to this thinness, two tube portions 131a are coupled openably and closably.

Further, in this embodiment, one end side as the mating tube portion 131a side of the rib portion 132a of each of the pair of tube portions 131a is a projecting section 132a-1 intersecting with the hinge section 131b. Further, each tube portion 131a is provided with a through hole 131a through which the projecting section 132a-1 of the mating tube portion 131a passes toward an inner periphery 131a-4 side when the pair of tube portions 131a is open. The rib portion 132a is provided so as to extend from around an edge of the through hole 131e opposite to the mating tube portion 131a.

Further, the through hole 131e with the rib portion 132a extending from the through hole 131e and the rib portion 132a of which the projecting section 132a-1 projects toward the mating tube portion 131a are arranged side by side in the axial direction D14 on the outer periphery 131a-3 of each tube portion 131a. Further, these two rib portions 132a in the axial direction D14 is arranged in a staggered manner in between the pair of tube portions 131a.

Further, in this embodiment, when such an inner member 13 is integrally molded with resin, molding dies corresponding to a shape of the inner member 13 of which tubular section 131 is open as shown in FIGS. 7, 9, and 10 are used. By molding with the inner member 13 in the open shape, the molding is performed by stripping the molding dies successfully in a vertical direction of each figure.

In the wiring harness protective structure 1 having the tube mounting structure 1a using such an inner member 13, with a method for mounting a tube following a procedure described below, the end section 11a of the corrugated tube 11 is fitted into and mounted on the protector 12.

In this method for mounting a tube, firstly, a first step in which the wiring harness W11 is inserted into an inside of the inner member 13 is performed. In this embodiment, this first step is the step in which the wiring harness W11 is inserted into an inside of the inner member 13 by arranging the wiring harness W11 in the inside of the opened inner member 13, then closing the inner member 13. When closing the inner member 13, by inserting and coupling the connection convex section 131c of each tube portion 131a into the connection concave section 131d of the mating tube portion 131a, the tubular section 131 becomes in a stable tubular shape.

Next to the first step, a second step in which the wiring harness W11 is inserted into an inside of the corrugated tube 11, and the inner member 13 is fitted into the end section 11a of the corrugated tube is performed. This fitting of the inner member 13 is performed such that the outer peripheral rib 132 of the inner member 13 is inserted into the inner peripheral annular concave section 113 at the end section 11a of the corrugated tube 11.

Lastly, a third step in which the end section 11a of the corrugated tube 11 is mounted on the protector 12 such that the inner peripheral rib 122 is inserted into the outer peripheral annular concave section 111 at the end section 11a is performed. After this third step, the method for mounting a tube is terminated, and the wiring harness protective structure 1 having the tube mounting structure 1a is completed.

According to the wiring harness protective structure 1, the tube mounting structure 1a, and the method for mounting a tube as described above, a crash of the end section 11a of the corrugated tube 11 is prevented by the hard tubular section 131. Further, by inserting the outer peripheral rib 132 into the inner peripheral annular concave section 113, a drop of the inner member 13 from the end section 11a of the corrugated tube 11 is also prevented. Further, the inner member 13 providing these prevention effects is received in an inside of the end section 11a of the corrugated tube 11. Thereby, it is unnecessary to provide a new space in the interior of the protector 12 where the end section 11a of the corrugated tube 11 is mounted, and the protector 12 is prevented from being large-sized. In this way, according to this embodiment, the protector 12 is prevented from being large-sized, while a crush of the end section 11a of the corrugated tube 11 is prevented.

Then, the crash prevention effect and the interference between the outer peripheral rib 132 of the inner member 13 and the inner peripheral rib 122 of the protector 12 while the outer wall of the corrugated tube is held therebetween are coupled to prevent successfully a drop of the corrugated tube 11 from the protector 12.

Here, in this embodiment, two rows of the outer peripheral ribs 132 of the inner member 13 are arranged side by side in an axial direction D14 of the tubular section 131. Because two rows of the outer peripheral ribs 132 are respectively inserted into the inner peripheral annular concave sections 113 of the corrugated tube 11, a drop of the inner member 13 from the corrugated tube 11 is further prevented. Further, in this embodiment, two rows of the outer peripheral ribs 132, allowing the inner peripheral ribs 122 of the protector 12 to interfere, exist in the drop direction D15 of the corrugated tube 11. Thereby, as described above with reference to FIGS. 5 and 6, the positional range of the end section 11a of the corrugated tube 11 where the interference between the outer peripheral rib 132 of the inner member 13 and the inner peripheral rib 122 of the protector 12 is established can be set wider than a case that the number of the outer peripheral ribs 132 is one row.

Further, in this embodiment, the tubular portion 131 is openable and closable with two tube portions 131a and the hinge section 131b. Further, the outer peripheral rib 132 is the collectivity of rib portions 132a provided respectively on the two tube portions 131. In this way, because the tubular portion 131 is openable and closable, the wiring harness W11 to be received in the corrugated tube 11 with the inner member 13 can easily pass into the inner member 13.

Further, in this embodiment, both end edges 131a-1, which are moved close to and away from each other upon open/close of the tubular portion 131, are respectively provided with the connection convex section 131c moved toward the mating end edge 131a-1, and the connection concave section 131d receiving and coupling the connection convex section 131c of the mating end edge 131a-1. Because the inner member 13 after inserting the wiring harness W11 can firmly keep the tubular shape by the coupling of the connection convex section 131c and the connection concave section 131d, a crash of the inner member 13 is also prevented. Thereby, a crash of the end section 11a of the corrugated tube 11 is further prevented.

Further, in this embodiment, the mating tube portion 131a side of the rib portion 132a of each of the pair of tube portions 131a, where the end edges 131a-2 are coupled together with the hinge portion 131b, is a projecting section 132a-1 intersecting with the hinge section 131b. Further, each tube portion 131a is provided with a through hole 131a through which the projecting section 132a-1 passes toward an inner periphery 131a-4 side when the pair of tube portions 131a is open, and the rib portion 132a is provided so as to extend from around an edge of the through hole 131e. In this embodiment, by providing the above through hole 131e, the projecting section 132a-1 is arranged so as to intersect with the hinge section 131b, and the rib portion 132a can extend long. Thereby, a total length of the outer peripheral rib 132 as the collectivity of the rib portions 132a, namely, an insertion length of the corrugated tube 11 into the inner peripheral annular concave section 113 can be long so that the drop of the inner member 13 from the end section 11a of the corrugated tube 11 is further prevented. Further, by extending the total length of the outer peripheral rib 132, the interference length with the inner peripheral rib 122 of the protector 12 is extended, and the drop of the corrugated tube 11 from the protector 12 is also further prevented.

Further, in the inner member 13 of this embodiment, by providing the above through hole 131e, the pair of tubular portions 131a can be in a good open shape without interfering with each other. Generally, when resin molding an annular member openable and closable with a hinge section, a molding die corresponding to an open shape is often used. According to this embodiment, because the inner member 13 can be in a good open shape, molding dies corresponding to the inner member 13 in the open shape can be used as described above. Then, by molding the inner member 13 in the open shape, the molding can be performed by stripping the molding dies successfully in a vertical direction of FIGS. 7, 9, and 10.

Further, the through hole 131e with the rib portion 132a extending from the through hole 131e and the rib portion 132a of which the projecting section 132a-1 projects toward the mating tube portion 131a are arranged side by side in the axial direction D14 on each tube portion 131a. Namely, each tube portion 131a is not provided with only the rib portions 132a extending from the through hole 131e, nor with only the rib portions 132a having the projecting section 132a-1. These two types of rib portions 132a are arranged alternately on each tube portion 131a. Further, these two rib portions 132a in the axial direction D14 is arranged in a staggered manner in between the pair of tube portions 131a. Thereby, by providing two rows of the outer peripheral ribs 132 having a divisional structure like above, a drop of the inner member 13 is further prevented, and eventually, a drop of the corrugated tube 11 from the protector 12 is also further prevented. Further, by arranging the rib portion 132a extending from the through hole 131e and the rib portion 132a of which the projecting section 132a-1 projects side by side on any one of the pair of tube portions 131a, a strength reduction caused by the through hole 131e in each tube portion 131a can be dispersed. In this way, according to this embodiment, by preventing the strength reduction in each tube portion 131a, the strength of the inner member 13 is improved, and a crash of the end section 11a of the corrugated tube 11 is further prevented.

Incidentally, in this embodiment, an embodiment providing two rows of the outer peripheral ribs having the divisional structure is exemplified. However, more than two rows of the outer peripheral ribs may be provided. In this case, preferably, the rib portion extending from the through hole and the rib portion of which the projecting section projects are arranged alternately in the axial direction. By such an alternate arrangement, a strength reduction caused by the through hole in each tube portion can be dispersed. Further, in this case also, preferably, these rib portions in the axial direction is arranged in a staggered manner in between the tube portions similar to this embodiment.

Further, in this embodiment, as shown in FIG. 4, the opposite side surface 132-2 opposite to the opening 11a-1 of the end section 11*a* of the corrugated tube 11 is a slope gentler than the opening side surface 132-1. Thereby, a resistance upon pushing and fitting the inner member 13 from the opening 11*a*-1 of the corrugated tube 11 is reduced, and a good workability can be attained. On the other hand, because the opening side surface 132-1 is a slope steeper than the opposite side surface 132-2, a drop of the corrugated tube 11 from the protector 12 is further prevented.

The explanation of the first embodiment has been completed, and next, a second embodiment will be explained. In this second embodiment, an inner member is different from the inner member 13 of the first embodiment. Whereas a tube mounting structure and a method for mounting a tube are similar to the tube mounting structure 1*a* and the method for mounting a tube in the first embodiment described above. Hereinafter, the second embodiment will be explained focused on the inner member as a different point from the first embodiment, and an overlapped explanation of the tube mounting structure and the method for mounting a tube similar to the first embodiment will be omitted.

Figure 11:
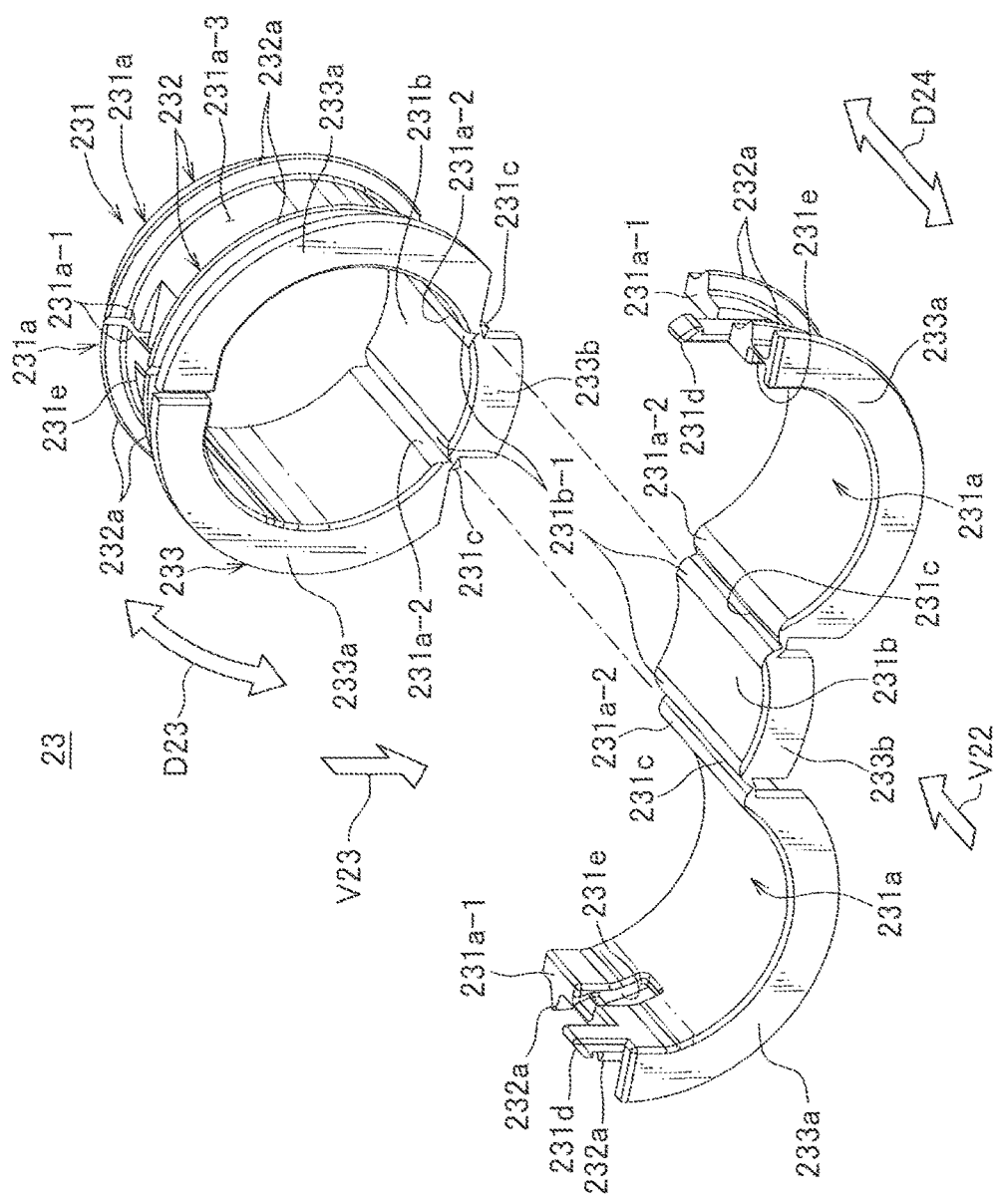
FIG. 11 is a perspective view showing an inner member according to a second embodiment.
Figure 12:
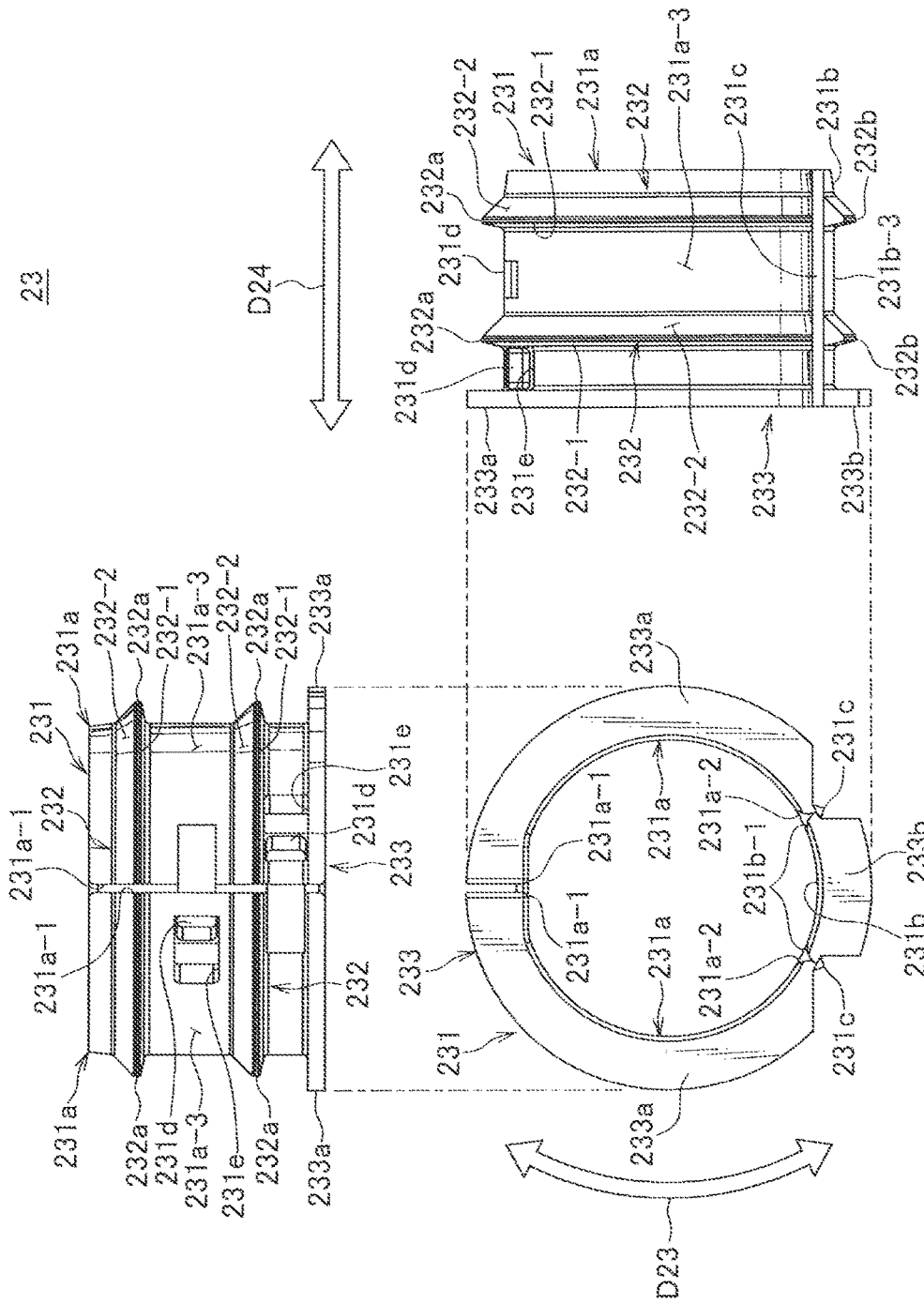
FIG. 12 is a three-sided view showing the inner member of FIG. 11.

FIG. 11 is a perspective view showing an inner member according to a second embodiment, and FIG. 12 is a three-sided view showing the inner member of FIG. 11.

In an inner member 23 of this embodiment, a tubular section 231 has a shape in which two wide tube portions 231*a* are arranged in a circumferential direction D23 holding a narrow tube portion 231*b* therebetween. Namely, the tubular section 231 has three tube portions different from the tubular portion 131 of the first embodiment described above. Further, two hinge sections 231*c* are provided for coupling end edges 231*a*-2, 231*b*-1 adjacent to each other in the wide tube portions 231*a* and the narrow tube portion 231*b* other than end edges 231*a*-1 of the wide tube portions 231*a* positioned at both ends of the arrangement. The tubular section 231 of this embodiment is openable and closable such that the end edges 231*a*-1 of the two wide tube portions 231*a* are moved close to and away from each other. FIG. 11 shows a closed state of the tubular section 231 and an open state of the tubular section 231 arranged side by side.

Figure 13:
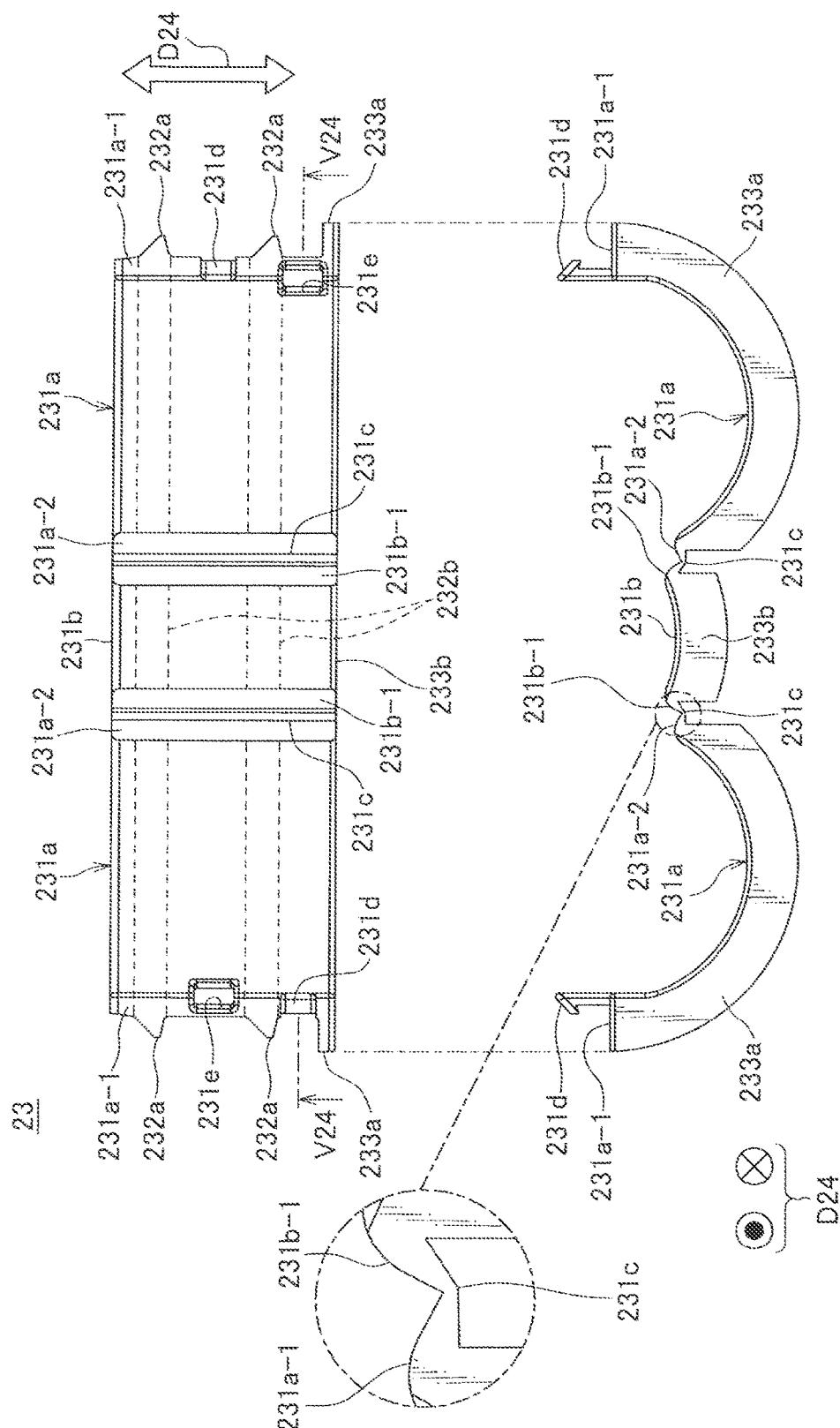
FIG. 13 is a front view of the inner member of which tubular section is open showing from an arrow V22 and a top view showing from an arrow V23 of FIG. 11.
Figure 14:
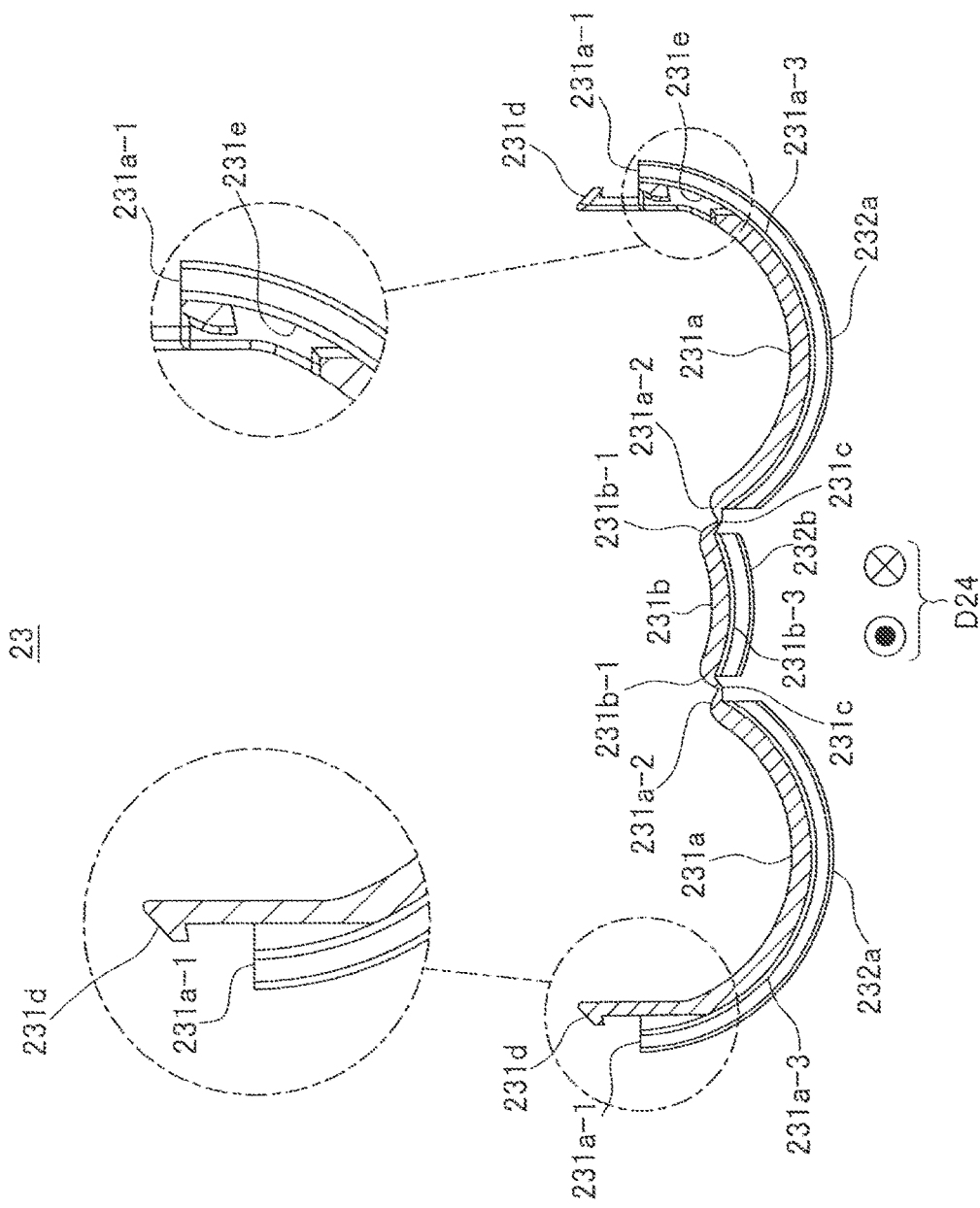
FIG. 14 is a sectional view taken on line V24-V24 of FIG. 13.

FIG. 13 is a front view of the inner member of which tubular section is open showing from an arrow V22 and a top view showing from an arrow V23 of FIG. 11, and FIG. 14 is a sectional view taken on line V24-V24 of FIG. 13.

In the inner rib 23, each of two rows of the outer peripheral ribs 232 is a collectivity of three rib portions as a part of a ring extending in the circumferential direction D23. Namely, each outer peripheral rib 232 includes: two rib portions 232*a* provided on outer peripheries 231*a*-3 of the two wide tube portions 231*a*; and a rib portion 232*b* provided on an outer periphery 231*b*-3 of the narrow tube portion 231*b*. Similarly, an exit flange 233 is also a collectivity of three flange portions as a part of a ring extending in the circumferential direction D23. Namely, the exit flange 233 includes: two flange portions 233*a* provided on front ends of the two wide tube portions 231*a*; and a flange portion 233*b* provided on a front end of the narrow tube portion 231*b*.

Further, in this embodiment also, a shape of a side surface of each outer peripheral rib 232 is similar to the first embodiment. Namely, when the outer peripheral rib 232 is inserted into the inner peripheral annular concave section 113 (refer to FIG. 4), both of an opening side surface 232-1 oriented toward the opening 11*a*-1 of the corrugated tube 11 and an opposite side surface 232-2 oriented toward the opposite side are sloped surfaces. Further, the opposite side surface 232-2 is a slope gentler than the opening side surface 232-1.

In this inner member 23, a connection convex section 231*d* projects from each end edge 231*a*-1 moved close to and away from each other as described above of the two wide tube portions 231*a* toward mating end edge 231*a*-1. Further, the end edge 231*a*-1 of each wide tube portion 231*a* is provided with a connection concave section 231*e* for receiving and connecting the connection convex section 231*d* from mating end edge 231*a*-1. The connection convex section 231*d* and the connection concave section 231*e* are arranged side by side in the axial direction D24 on the end edge 231*a*-1 of each wide tube portion 231*a*. Further, the connection convex section 231*d* and the connection concave section 231*e* are arranged in a staggered manner in between two wide tube portions 231*a*.

Further, as shown in an enlarged view of FIG. 13, a resin of the hinge section 231*c* coupling the wide tube portion 231*a* and the narrow tube portion 231*b* is formed thinner than the tube portions 231*a*, 231*b*. Owning to this thinness, the hinge section 231*c* couples the wide tube portion 231*a* and the narrow tube portion 231*b* openably and closably.

Further, in this embodiment, when such an inner member 23 is integrally molded with resin, molding dies corresponding to a shape of the inner member 23 of which tubular section 231 is open as shown in FIGS. 11, 13, and 14 are used. By molding with the inner member 23 in the open shape, the molding is performed by stripping the molding dies successfully in a vertical direction of each figure.

Further, in this step in which the wiring harness W11 is inserted into the inner member 23, similar to the first embodiment, the wiring harness W11 is inserted into an inside of the inner member 23 by arranging the wiring harness W11 in the inside of the opened inner member 13, then closing the inner member 23. Owing to such a step, the wiring harness W11 can be easily inserted into an inside of the inner member 23. Further, when closing the inner member 23, by inserting and coupling the connection convex section 231*d* of each wide tube portion 231*a* into the connection concave section 231*e* of the mating wide tube portion 231*a*, the tubular section 231 becomes in a stable tubular shape.

In the second embodiment, owing to the inner member 23 described above, the tube mounting structure, and the tube mounting method using the inner member 23 similar to the first embodiment, the effects similar to the first embodiment can be attained. Namely, needless to say, in this second embodiment also, the protector 12 is prevented from being large-sized, while a crush of the end section 11*a* of the corrugated tube 11 is prevented.

Further, in this embodiment, as described above, the tubular section 231 has a shape in which two wide tube portions 231*a* are arranged in a circumferential direction D23 holding the narrow tube portion 231*b* therebetween. Thereby, as shown in FIG. 14, even when the inner member 23 is open, the outer peripheries 231*a*-3, 231*a*-*b* of the pair of tube portions positioned while holding the hinge section 231*c* therebetween are open in some degree to each other. As a result, even in this open state, the rib portions 232*a*, 232*b* are prevented from interfering with each other around the hinge section 231*c*. Therefore, the rib portions 232*a*, 23*ab* extending substantially the whole length in the circumferential direction D23 can be formed on the two wire tube portions 231*a* and the one narrow tube portion 231*b* respectively.

In this embodiment, in this way, a total length of the outer peripheral rib 231 as the collectivity of the rib portions 232*a*, 232*b*, namely, an insertion length of the corrugated tube 11 to the inner peripheral annular concave section 113 is long.

Thereby, the drop of the inner member 23 from the end section 11a of the corrugated tube 11 is further prevented. Further, by extending the total length of the outer peripheral rib 232, the interference length with the inner peripheral rib 122 of the protector 12 is extended, and the drop of the corrugated tube 11 from the protector 12 is also further prevented.

Further, in the inner member 23 of this embodiment, by dividing the tubular section 231 into three tube portions, the rib portions 232a, 232b are prevented from interfering with each other around the hinge section 231c as described above, and the inner member can be in a good open shape. Thereby, similar to the first embodiment, molding dies corresponding to the inner member 23 in an open shape can be used. Then, by molding the inner member 23 in the open shape, the molding can be performed by stripping the molding dies successively in a vertical direction of FIGS. 11, 13, and 14.

The explanation of the second embodiment has been completed, and next, a third embodiment will be explained. In this third embodiment also, an inner member is different from the inner member 13 of the first embodiment. Whereas a tube mounting structure and a method for mounting a tube are similar to the tube mounting structure 1a and the method for mounting a tube in the first embodiment described above. Hereinafter, the third embodiment will be also explained focused on the inner member as a different point from the first embodiment, and an overlapped explanation of the tube mounting structure and the method for mounting a tube similar to the first embodiment will be omitted.

Figure 15:
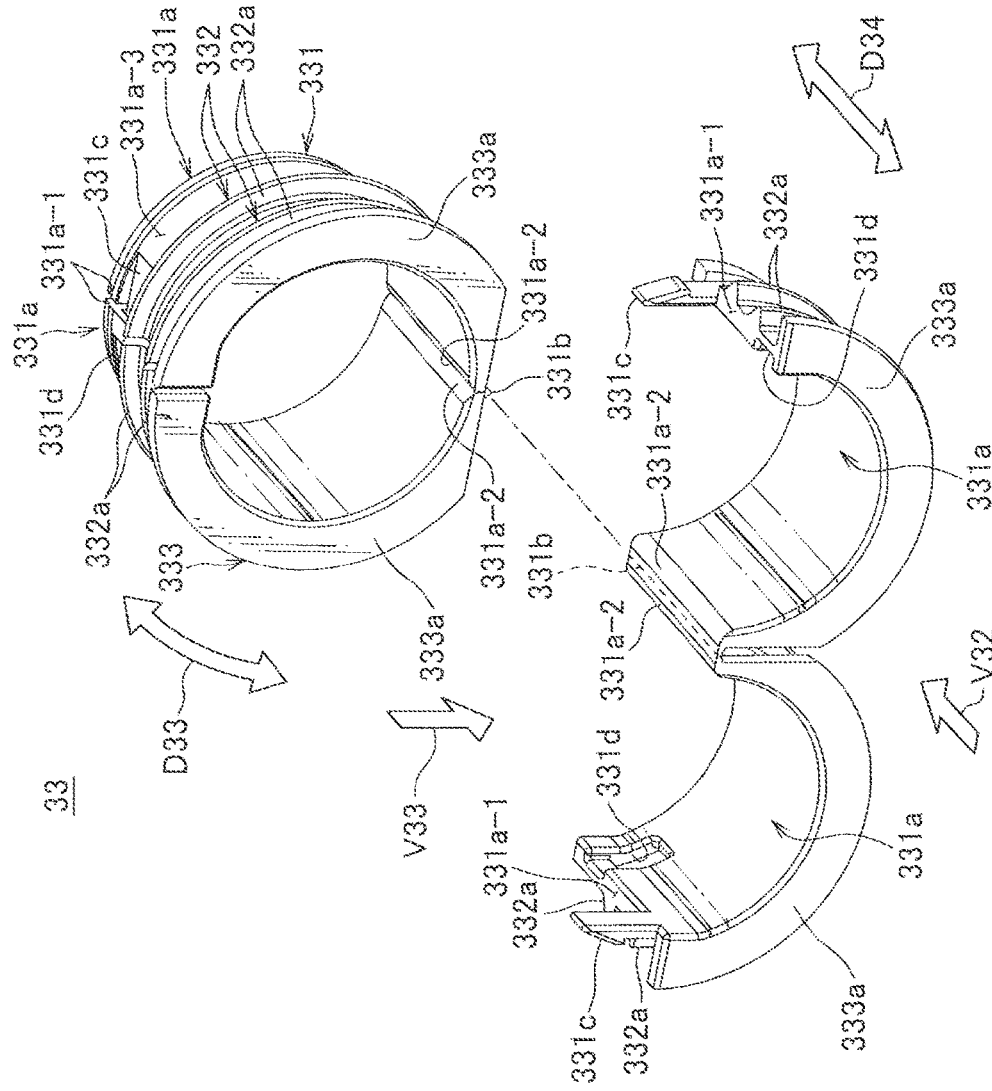
FIG. 15 is a perspective view showing an inner member according to a third embodiment.
Figure 16:
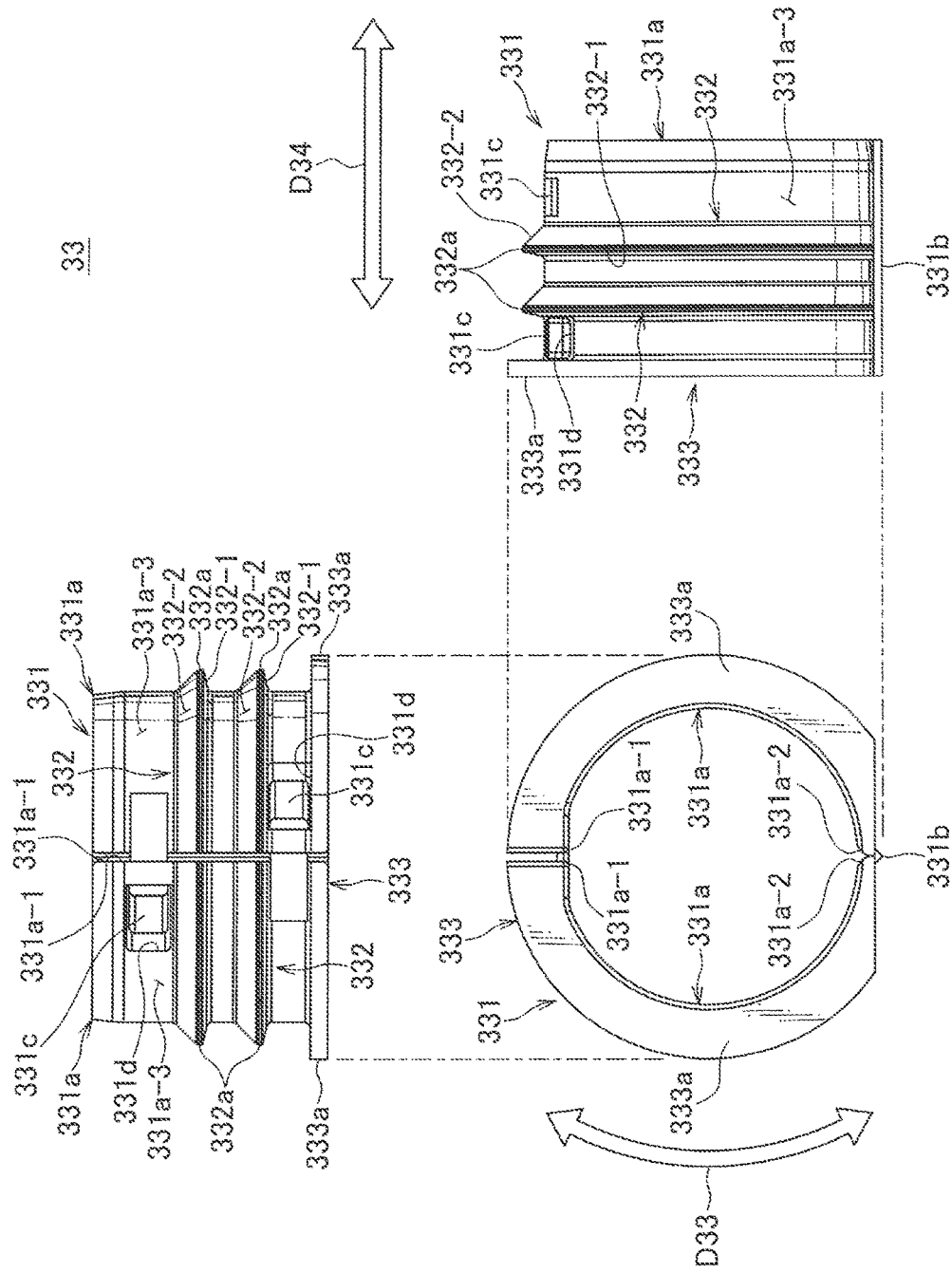
FIG. 16 is a three-sided view showing the inner member of FIG. 15.

FIG. 15 is a perspective view showing an inner member according to a third embodiment, and FIG. 16 is a three-sided view showing the inner member of FIG. 15.

In the inner member 33 of this embodiment, the tubular section 331 includes: two tube portions 331a arranged in the circumferential direction D33; and a hinge section 331b joining end edges 331a-2 adjacent to each other of the two tube portions 331a other than both ends of the arranged end edges 331a-1. This tubular section 331 is openable and closable such that both end edges 331a-1 are moved close to and away from each other. FIG. 15 shows a closed state of the tubular section 331 and an open state of the tubular section 331 arranged side by side.

Figure 17:
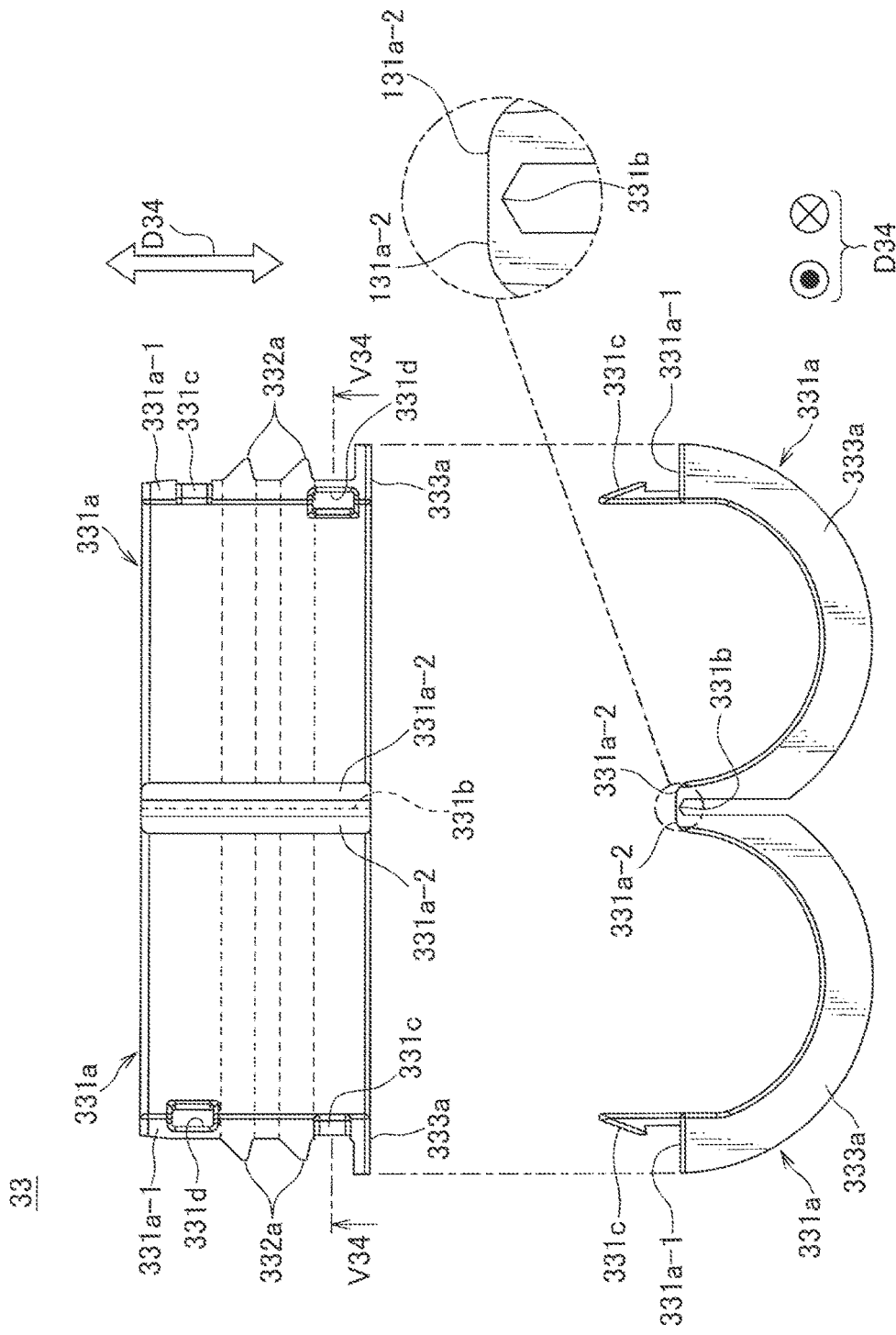
FIG. 17 is a front view of the inner member of which tubular section is open showing from an arrow V32 and a top view showing from an arrow V33 of FIG. 15.
Figure 18:
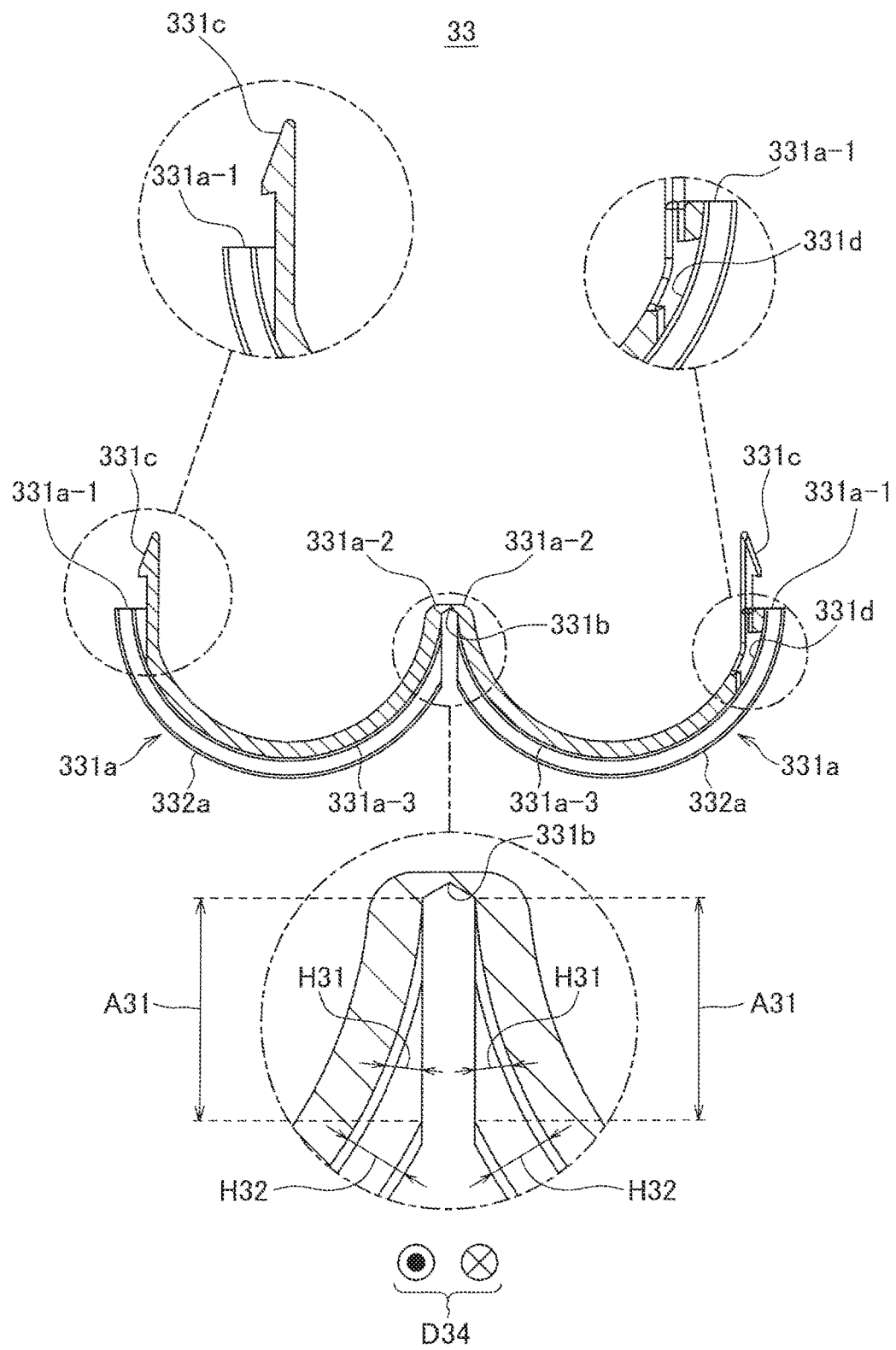
FIG. 18 is a sectional view taken on line V34-V34 of FIG. 17.

FIG. 17 is a front view of the inner member of which tubular section is open showing from an arrow V32 and a top view showing from an arrow V33 of FIG. 15, and FIG. 18 is a sectional view taken on line V34-V34 of FIG. 17.

In the inner member 33, the outer peripheral rib 332 is a collectivity of two rib portions 332a each as a part of a ring extending in the circumferential direction D33. Each rib portion 332a is provided on an outer periphery 331a-3 of each of two tube portions 331a. Similarly, the exit flange 333 is a collectivity of two flange portions 333a each as a part of a ring extending in the circumferential direction D33. Each flange portion 333 is provided on a front end of each of two tube portions 331a.

Further, in this embodiment also, a shape of a side surface of each outer peripheral rib 332 is similar to the first embodiment. Namely, when the outer peripheral rib 332 is inserted into the inner peripheral annular concave section 113 (refer to FIG. 4), both of an opening side surface 332-1 oriented toward the opening 11a-1 of the corrugated tube 11 and an opposite side surface 332-2 oriented toward the opposite side are sloped surfaces. Further, the opposite side surface 332-2 is a slope gentler than the opening side surface 332-1.

In this inner member 33, a connection convex section 331c projects from each end edge 331a-1 moved close to and away from each other as described above of the two tube portions 331a toward mating end edge 331a-1. Further, the end edge 331a-1 of each tube portion 331a is provided with a connection concave section 331d for receiving and connecting the connection convex section 331c from mating end edge 331a-1. The connection convex section 331c and the connection concave section 331d are arranged side by side in the axial direction D34 on the end edge 331a-1 of each tube portion 331a. Further, the connection convex section 331c and the connection concave section 331d are arranged in a staggered manner in between two tube portions 331a.

Further, as shown in enlarged views of FIGS. 17 and 18, a resin of the hinge section 331b coupling two tube portions 331a is formed thinner than the tube portion 331a, and owning to this thinness, two tube portions 331a are coupled openably and closably.

Further, in this embodiment, as shown in an enlarged view of FIG. 18, in each rib portion 332a of the two tube portions 331a, a rib height H31 within a predetermined range A31 from the hinge section 331b is formed lower than a rib height H32 without the predetermined range A31. Its low degree is an extent that two tube portions 332a does not interfere with each other when opening the two tube portions 332a. A shape of the rib portion 332a within the predetermined range A31 is a tapered shape such that the rib height H31 is gradually decreased as approaching the hinge section 331b.

Further, in this embodiment, when such an inner member 33 is integrally molded with resin, molding dies corresponding to a shape of the inner member 33 of which tubular section 331 is open as shown in FIGS. 15, 17, and 18 are used. By molding with the inner member 33 in the open shape, the molding is performed by stripping the molding dies successively in a vertical direction of each figure.

Further, in this step in which the wiring harness W11 is inserted into the inner member 33, similar to the first embodiment, the wiring harness W11 is inserted into an inside of the inner member 33 by arranging the wiring harness W11 in the inside of the opened inner member 33, then closing the inner member 33. Owing to such a step, the wiring harness W11 can be easily inserted into an inside of the inner member 33. Further, when closing the inner member 33, by inserting and coupling the connection convex section 331d of each tube portion 331a into the connection concave section 331e of the mating tube portion 331a, the tubular section 331 becomes in a stable tubular shape.

In the third embodiment, owing to the inner member 33 described above, the tube mounting structure, and the tube mounting method using the inner member 33 similar to the first embodiment, the effects similar to the first embodiment can be attained. Namely, needless to say, in this third embodiment also, the protector 12 is prevented from being large-sized, while a crush of the end section 11a of the corrugated tube 11 is prevented.

Further, in this embodiment, in each rib portion 332a of the outer peripheries 331a-3 of the two tube portions 331a, a rib height H31 within a predetermined range A31 from the hinge section 331b is formed low as described above. Thereby, as shown in FIGS. 15, 17, and 18, the pair of tube portions 331a can be in a good open shape without interfering with each other. Thereby, similar to the first embodiment, molding dies corresponding to the inner member 33 in an open shape can be used. Then, by molding the inner member 33 in the open shape, the molding can be performed by stripping the molding dies successfully in a vertical direction of FIGS. 15, 17, and 18.

Incidentally, the first to third embodiments described above only indicate typical modes of the present invention, and the present invention is not limited to these embodiments. Namely, various modifications can be carried out within a scope of the present invention. As long as including the configurations of the protective member, tube mounting structure, and method for mounting a tube of the present invention, these modifications are still included in a scope of the present invention.

For example, in the above embodiments, the tube mounting structure 1a in the wiring harness protective structure 1 for protecting the wiring harness W11 mounted on a vehicle is exemplified as an example of the tube mounting structure of the present invention. Further, as an example of the method for mounting a tube, a method for mounting a tube by assembling such a tube mounting structure 1a is exemplified. However, the tube mounting structure and a method for mounting a tube of the present invention are not limited to these, and specific application subjects are not asked.

Further, in the embodiments described above, as an example of a protector of the present invention, a rectangular tubular protector 12 is exemplified. However, a protector of the present invention is not limited to this. As long as a tubular protector, any specific shape can be set according to an installation condition.

Further, in the embodiments described above, as an example of a protective member of the present invention, the inner member 13, 23, 33 having tubular section 131, 231, 331, openable and closable, divided to two or three tube portions are exemplified. However, the protective member of the present invention is not limited to these, and may include a non-divided tubular section, or may include a tubular section divided to more than three tube portions. However, by including divided tubular section openable and closable, an insertion operation of the wiring harness into an inside of the protective member becomes easy as described above.

Further, in the embodiments described above, as an example of a protective member of the present invention, the inner member 13, 23, 33 having two rows of outer peripheral ribs 132, 232, 332 are exemplified. However, the protective member of the present invention is not limited to these, and the specific arrangement of the outer peripheral ribs is not asked. However, by arranging a plurality of outer peripheral ribs, a drop of the protective member from the corrugated tube, a drop of the corrugated tube from the protector are successfully prevented as described above.

REFERENCE SIGNS LIST 1 wiring harness protective structure
1a tube mounting structure
11 corrugated tube
11a end section
11a-1 opening
12 protector
12a mounting opening
12b exit
12-1 main body section
12-2 cap section
13, 23,33 inner member (protective member)
111 outer peripheral annular concave section
112 outer peripheral annular convex section
113 inner peripheral annular concave section
114 inner peripheral annular convex section
121 inner periphery
122 inner peripheral rib
123 stopper rib
131, 231, 331 tubular section
131a, 331a tube portion
131a-1, 131a-2, 231a-1, 231a-2, 231b-1, 331a-1, 331a-2 end edge
131-1, 131a-3, 231a-3, 231b-3, 331a-3 outer periphery
131a-4 inner periphery
131b, 231c, 331b hinge section
131c, 231d, 331c connection convex section
131d, 231e, 331d connection concave section
131e through hole
132, 232, 332 outer peripheral rib
132-1, 232-1, 332-1 opening side surface
132-2, 232-2, 332-2 opposite side surface
132a, 232a, 232b, 332a rib portion
132a-1 projecting section
133, 233, 333 exit flange
133a, 233a, 333a flange portion
231a wide tube portion
231b narrow tube portion
A31 predetermined range
H31, H32 rib height
D11 inner circumferential direction
D12, D14, D24, D34 axial direction
D13, D23, D33 circumferential direction
D15 drop direction
W11 wiring harness

The invention claimed is:
1. A protective member comprising:
a tubular section fitted into an end section of a corrugated tube, and harder than the corrugated tube; and
an outer peripheral rib formed so as to extend in a circumferential direction on an outer periphery of the tubular section, and inserted into an inner peripheral annular concave section at the end section of the corrugated tube,
wherein the tubular section includes:
a plurality of tube portions arranged in the circumferential direction; and
a hinge section joining end edges adjacent to each other of the plurality of tube portions other than both ends of the arranged end edges,
wherein the tubular section is openable and closable such that the both ends of end edges are moved close to and away from each other, and
wherein the outer peripheral rib is a collectivity of rib portions as a part of a ring extending in the circumferential direction, and the rib portions are provided on respective outer peripheries of the tube portions.
2. The protective member as claimed in claim 1,
wherein a plurality of the outer peripheral ribs is formed side by side in an axial direction of the tubular section.
3. The protective member as claimed in claim 1,
wherein a connection convex section projects from at least one end edge of the both ends of end edges toward another end edge of the both ends of end edges, and the another end edge is provided with a connection concave section for receiving and connecting with the connection convex section.
4. The protective member as claimed in claim 1,
wherein one tube portion of a pair of tube portions, of which end edges are connected to each other with the hinge section, is provided with the rib portion of which one end is a projecting section intersecting with the hinge section and projecting toward another tube portion of the pair of tube portions, and wherein the another tube portion of the pair of tube portions is provided with the rib portion so as to extend from around an edge of a through hole opposite to the hinge section when the pair of tube portions is open, said through hole provided such that the projecting section of the one tube portion passes therethrough toward an inner periphery side.

5. The protective member as claimed in claim 3, wherein one tube portion of a pair of tube portions, of which end edges are connected to each other with the hinge section, is provided with the rib portion of which one end is a projecting section intersecting with the hinge section and projecting toward another tube portion of the pair of tube portions, and wherein the another tube portion of the pair of tube portions is provided with the rib portion so as to extend from around an edge of a through hole opposite to the hinge section when the pair of tube portions is open, said through hole provided such that the projecting section of the one tube portion passes therethrough toward an inner periphery side.

6. The protective member as claimed in claim 1, wherein the plurality of outer peripheral ribs is arranged side by side in the axial direction of the tubular section, and each of the outer peripheral rib is the collectivity, wherein each of the pair of tube portions with the end edges connected to each other by the hinge section is provided with a first rib portion of which one end is a projecting section intersecting with the hinge section and projecting toward the mating tube portion, and a second rib portion extending from around an edge of a through hole opposite to the hinge section when the pair of tube portions is open, said through hole provided such that the projecting section of the mating tube portion passes therethrough toward an inner periphery side, wherein the first and second rib portions are arranged alternately in the axial direction, and wherein the rib portion having the projecting section and the rib portion extending from the through hole are arranged in a staggered manner in the axial direction in between the pair of tube portions.

7. The protective member as claimed in claim 3, wherein the plurality of outer peripheral ribs is arranged side by side in the axial direction of the tubular section, and each of the outer peripheral rib is the collectivity, wherein each of the pair of tube portions with the end edges connected to each other by the hinge section is provided with a first rib portion of which one end is a projecting section intersecting with the hinge section and projecting toward the mating tube portion, and a second rib portion extending from around an edge of a through hole opposite to the hinge section when the pair of tube portions is open, said through hole provided such that the projecting section of the mating tube portion passes therethrough toward an inner periphery side, wherein the first and second rib portions are arranged alternately in the axial direction, and wherein the rib portion having the projecting section and the rib portion extending from the through hole are arranged in a staggered manner in the axial direction in between the pair of tube portions.

8. The protective member as claimed in claim 1, wherein the plurality of tube portions is two tube portions, and wherein in the rib portions of the outer peripheries of the two tube portions, a rib height is lower for a portion within a predetermined range from the hinge section than for a portion out of the predetermined range such that the rib portions within the predetermined range do not interfere with each other when the two tube portions are opened.

9. A tube mounting structure for mounting a corrugated tube on a tubular protector by fitting an end section of the corrugated tube, into which a wiring harness is inserted, into the protector, wherein at least one row of an inner peripheral rib extending in an inner circumference direction is formed on an inner periphery of the protector, wherein the end section of the corrugated tube is mounted on the protector such that the inner peripheral rib is inserted into an outer peripheral annular concave section at the end section, and wherein the protective member as claimed in claim 1 is fitted into the end section of the corrugated tube while the wiring harness is inserted into an inside of the protective member.

10. A protective member comprising:
a tubular section fitted into an end section of a corrugated tube, and harder than the corrugated tube; and
an outer peripheral rib formed so as to extend in a circumferential direction on an outer periphery of the tubular section, and inserted into an inner peripheral annular concave section at the end section of the corrugated tube, wherein the outer peripheral rib has an opening side surface oriented to an opening side of the end section of a corrugated tube when inserted into the inner peripheral annular concave section, and an opposite side surface oriented to an opposite side, and wherein the opposite side surface is a slope gentler than that of the opening side surface.

11. A method for mounting a tube by fitting an end section of a corrugated tube, into which a wiring harness is inserted, into a tubular protector, wherein at least one row of an inner peripheral rib extending in an inner circumference direction is formed on an inner periphery of the protector, said method comprising:
a first step of inserting the wiring harness into an inside of a protective member having a tubular section harder than the corrugated tube and an outer peripheral rib formed so as to extend in a circumferential direction on an outer periphery of the tubular section;

a second step of inserting the wiring harness into an inside of the corrugated tube and fitting the protective member into the end section such that the outer peripheral rib is inserted into an inner peripheral annular concave section at the end section of the corrugated tube; and a third step of mounting the end section of the corrugated tube on the protector such that the inner peripheral rib is inserted into an outer peripheral annular concave section at the end section, wherein the tubular section of the protective member includes: a plurality of tube portions arranged in the circumferential direction; and a hinge section joining end edges adjacent to each other of the plurality of tube portions other than both ends of the arranged end edges, the tubular section is openable and closable such that both end edges are moved close to and away from each other, the outer peripheral rib is a collectivity of rib portions as a part of a ring extending in the circumferential direction, and wherein the first step is the step of inserting the wiring harness into an inside of the protective member such that after the wiring harness is arranged inside of the protective member while the protective member is open and both end edges are away from each other, the protective member is closed.

* * * * *